US007210502B2

(12) United States Patent
Fuller et al.

(10) Patent No.: US 7,210,502 B2
(45) Date of Patent: May 1, 2007

(54) MICROVALVE DEVICE SUITABLE FOR CONTROLLING A VARIABLE DISPLACEMENT COMPRESSOR

(75) Inventors: Edward Nelson Fuller, Manchester, MI (US); Brady Reuben Davies, Bellingham, WA (US); Jeffrey Ross Uibel, Bellingham, WA (US); Steven Brent Booth, Bellingham, WA (US); Jeffrey Oliver Chance, Bellingham, WA (US)

(73) Assignee: Microstaq Inc., Bellingham, WA (US)

( * ) Notice: Subject to any disclaimer, the term of this patent is extended or adjusted under 35 U.S.C. 154(b) by 0 days.

(21) Appl. No.: 11/437,022

(22) Filed: May 18, 2006

(65) Prior Publication Data

US 2006/0243331 A1    Nov. 2, 2006

Related U.S. Application Data

(63) Continuation of application No. PCT/US04/39517, filed on Nov. 24, 2004.

(60) Provisional application No. 60/525,224, filed on Nov. 24, 2003, provisional application No. 60/559,355, filed on Apr. 2, 2004.

(51) Int. Cl.
*F15B 5/00* (2006.01)

(52) U.S. Cl. ............................ 137/625.65; 137/596.16; 137/625.66; 137/625.64; 251/25; 251/30.01

(58) Field of Classification Search ........... 137/596.16, 137/625.65, 625.64, 625.66; 251/25, 30.01; 417/222.2
See application file for complete search history.

(56) References Cited

U.S. PATENT DOCUMENTS

| 5,611,214 | A | 3/1997 | Wegeng et al. |
|---|---|---|---|
| 6,019,437 | A | 2/2000 | Barron et al. |
| 6,279,606 | B1 | 8/2001 | Hunnicutt et al. |
| 6,390,782 | B1 | 5/2002 | Booth et al. |
| 6,494,804 | B1 | 12/2002 | Hunnicutt et al. |
| 6,505,811 | B1 | 1/2003 | Barron et al. |
| 6,533,366 | B1 | 3/2003 | Barron et al. |
| 6,540,203 | B1 | 4/2003 | Hunnicutt |
| 6,581,640 | B1 | 6/2003 | Barron |
| 6,637,722 | B2 | 10/2003 | Hunnicutt |
| 6,694,998 | B1 * | 2/2004 | Hunnicutt ................. 137/116.3 |
| 7,011,378 | B2 * | 3/2006 | Maluf et al. ............. 303/119.2 |
| 2003/0092526 | A1 | 5/2003 | Hunnicutt et al. |
| 2006/0218953 | A1 | 10/2006 | Hirota |

* cited by examiner

*Primary Examiner*—Eric Keasel
*Assistant Examiner*—Craig Schneider
(74) *Attorney, Agent, or Firm*—MacMillan, Sobanski & Todd, LLC

(57) ABSTRACT

A device is disclosed for controlling a variable displacement compressor. The device comprises a microvalve operated control valve. A microvalve device for controlling fluid flow and a micro spool valve for use as a microvalve are also disclosed.

11 Claims, 24 Drawing Sheets

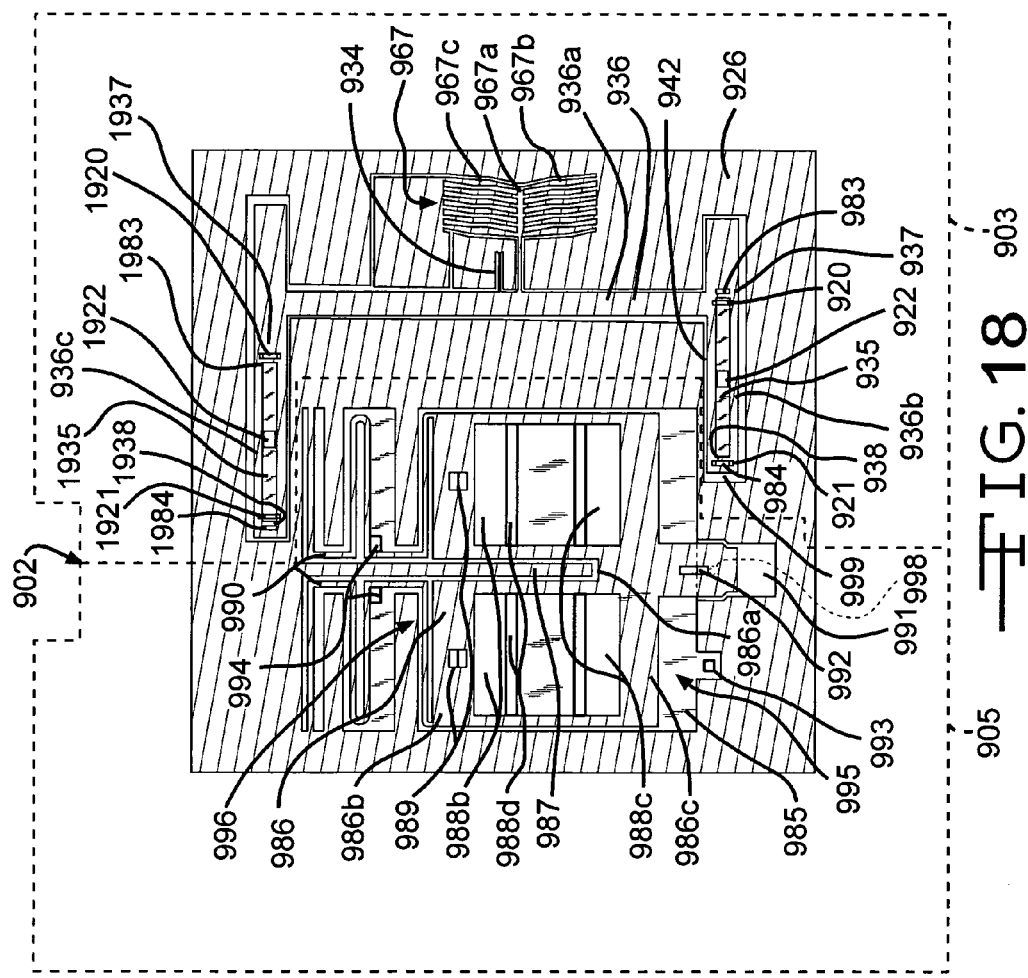

MICROVALVE DEVICE SUITABLE FOR CONTROLLING A VARIABLE DISPLACEMENT COMPRESSOR

CROSS-REFERENCE TO RELATED APPLICATIONS

This application is a continuation of International Application No. PCT/US2004/039517, filed Nov. 24, 2004, which claims priority from U.S. Provisional Application No. 60/525,224, filed Nov. 24, 2003 and U.S. Provisional Application No. 60/559,355, filed Apr. 2, 2004. The disclosures of all three applications are incorporated herein by reference.

STATEMENT REGARDING FEDERALLY SPONSORED RESEARCH OR DEVELOPMENT

This invention was made with United States Government support under cooperative agreement number 70NANB2H3003 awarded by the National Institute of Standards and Technology (NIST). The United States Government has certain rights in the invention.

BACKGROUND OF INVENTION

1. Field of the Invention

The present invention relates in general to control valves and to semiconductor electromechanical devices, and in particular, to a control valve for a variable displacement gas compressor for use in an air conditioning or refrigeration system, which control valve is positioned by a microvalve device (micromachined pilot valve).

2. Description of the Related Art

MEMS (MicroElectroMechanical Systems) is a class of systems that are physically small, having features with sizes in the micrometer range. These systems have both electrical and mechanical components. The term "micromachining" is commonly understood to mean the production of three-dimensional structures and moving parts of MEMS devices. MEMS originally used modified integrated circuit (computer chip) fabrication techniques (such as chemical etching) and materials (such as silicon semiconductor material) to micromachine these very small mechanical devices. Today there are many more micromachining techniques and materials available. The term "microvalve" as used in this application means a valve having features with sizes in the micrometer range, and thus by definition is at least partially formed by micromachining. The term "microvalve device" as used in this application means a device that includes a microvalve, and that may include other components. It should be noted that if components other than a microvalve are included in the microvalve device, these other components may be micromachined components or standard sized (larger) components.

Various microvalve devices have been proposed for controlling fluid flow within a fluid circuit. A typical microvalve device includes a displaceable member or valve movably supported by a body and operatively coupled to an actuator for movement between a closed position and a fully open position. When placed in the closed position, the valve blocks or closes a first fluid port that is placed in fluid communication with a second fluid port, thereby preventing fluid from flowing between the fluid ports. When the valve moves from the closed position to the fully open position, fluid is increasingly allowed to flow between the fluid ports. U.S. Pat. No. 6,540,203 entitled "Pilot Operated Microvalve Device", the disclosures of which are hereby incorporated herein by reference, describes a microvalve device consisting of an electrically operated pilot microvalve and a pilot operated microvalve whose position is controlled by the pilot microvalve. U.S. Pat. No. 6,494,804 entitled "Microvalve for Electronically Controlled Transmission", the disclosures of which are hereby incorporated herein by reference, describes a microvalve device for controlling fluid flow in a fluid circuit, and includes the use of a fluid bleed path through an orifice to form a pressure divider circuit. The two US patents mentioned above are multilayer microvalves in that the valve bodies are formed of multiple layers or plates. These layers may be formed and joined in any suitable fashion, including those disclosed in U.S. Patent Application Publication No. US 2002/0174891A, the disclosures of which are incorporated herein by reference.

In addition to generating a force sufficient to move the displaced member, the actuator must generate a force capable of overcoming the fluid flow forces acting on the displaceable member that oppose the intended displacement of the displaced member. These fluid flow forces generally increase as the flow rate through the fluid ports increases.

Variable displacement gas compressors are known which can be utilized in systems such as automotive air conditioning systems using a compressible refrigerant such as R-12, (increasingly) R-134a, R-600, or $CO_2$.

In such an air conditioning system, the refrigerant gas is compressed in a gaseous form by a compressor and discharged by the compressor at a high pressure and temperature. The gas moves to a condenser, where the high pressure, high temperature gas condenses into a high pressure, high temperature liquid, the energy released in this state change being transferred to air passing over the condenser fins in the form of heat. From the condenser, the liquid travels through an expansion device, where the pressure (and temperature) of the liquid is lowered. The cool low pressure liquid to an evaporator where the liquid absorbs heat for air passing over the evaporator coils, thus cooling the air. As the refrigerant absorbs heat, the refrigerant changes state from a liquid to a gas. The cooled air passes out into the compartment to be cooled. The degree to which the air is cooled is proportional to the amount of heat transferred to the refrigerant gas, and the amount of heat transferred to the refrigerant gas is directly proportional to how much gas is compressed within the compressor to drive the process. The amount of gas being compressed is controlled within a variable displacement compressor by controlling the amount of displacement of a piston within a compression chamber of the variable displacement compressor. It is known to use a control valve to control the displacement of the pistons in variable displacement compressors.

A key concern in designing a cooling system utilizing refrigerant gas is too ensure that the liquid from the condenser does not flow in a quantity and temperature to push the evaporator below the freezing point of water. If there is too much heat absorption by the gas within the evaporator, the water found on the fins and tubes through condensation of water vapor from air passing over the evaporator will freeze up, choking off air flow through the evaporator, thereby cutting off the flow of cool air to the passenger compartment. For this reason, most conventional control valves are calibrated to change the stroke (displacement) of the compressor to control the pressure of the gas returning to the compressor at a set pressure. The gas returns to the suction area of the compressor. The pressure in this area of the compressor is known as the suction pressure. The desired suction pressure, around which the stroke of the compressor is changed, is known within the art as the set-point suction pressure.

In 1984, a variable displacement refrigerant compressor was introduced which adjusted the flow of the refrigerant gas through the system by varying the stroke of the piston in the pumping mechanism of the compressor in the manner just described. This system was designed for use in an automobile, deriving power to drive the compressor using a drive belt coupled to the vehicle's engine. In operation, when the A/C system load is low, the piston stroke of the compressor is shortened so that the compressor pumps less refrigerant per revolution of the engine drive belt. This allows just enough refrigerant to satisfy the cooling demands of the automobile's occupants. When the A/C system load is high, the piston stroke is lengthened and pumps more refrigerant per revolution of the engine drive belt.

A description of this prior art variable displacement compressor and a conventional pneumatic control valve (CV) is found in U.S. Pat. No. 4,428,718 by Skinner (Skinner '718) which is assigned to the General Motors Corporation of Detroit, Mich. The Skinner '718 description and explanation of the variable displacement compressor, general function, and interaction of the CV with the compressor is hereby incorporated by reference.

FIG. 9 shows a variable displacement refrigerant compressor as described by Skinner '718. There is shown a variable displacement refrigerant compressor 210 of the variable angle wobble plate type connected in an automotive air conditioning system having the normal condenser 212, orifice tube 214, evaporator 216 and accumulator 218 arranged in that order between the compressor's discharge and suction sides. The compressor 210 comprises a cylinder block 220 having a head 222 and a crankcase 224 sealingly clamped to opposite ends thereof. A drive shaft 226 is supported centrally in the compressor at the cylinder block 220 and crankcase 224 by bearings. The drive shaft 226 extends through the crankcase 224 for connection to an automotive engine (not shown) by an electromagnetic clutch 236 which is mounted on the crankcase 224 and is driven from the engine by a belt 238 engaging a pulley 240 on the clutch 236.

The cylinder block 220 has five axial cylinders 242 through it (only one being shown), which are equally spaced about and away from the axis of drive shaft 226. The cylinders 242 extend parallel to the drive shaft 226 and a piston 244 is mounted for reciprocal sliding movement in each of the cylinders 242. A separate piston rod 248 connects the backside of each piston 244 to a non-rotary, ring-shaped, wobble plate 250.

The non-rotary wobble plate 250 is mounted at its inner diameter 264 on a journal 266 of a rotary drive plate 268. The drive plate 268 is pivotally connected at its journal 266 by a pair of pivot pins (not shown) to a sleeve 276 which is slidably mounted on the drive shaft 226, to permit angulation of the drive plate 268 and wobble plate 250 relative to the drive shaft 226. The drive shaft 226 is drivingly connected to the drive plate 268. The wobble plate 250 while being angularable with the rotary drive plate 268 is prevented from rotating therewith by a guide pin 270.

The angle of the wobble plate 250 is varied with respect to the axis of the drive shaft 226 between the solid line large angle position shown in FIG. 9, which is full-stroke, to the zero angle phantom-line position shown, which is zero stroke, to thereby infinitely vary the stroke of the pistons and thus the displacement or capacity of the compressor between these extremes. There is provided a split ring return spring 272 which is mounted in a groove on the drive shaft 226 and has one end that is engaged by the sleeve 276 during movement to the zero wobble angle position and is thereby conditioned to initiate return movement.

The working ends of the cylinders 242 are covered by a valve plate assembly 280, which is comprised of a suction valve disk and a discharge valve disk, clamped to the cylinder block 220 between the latter and the head 222. The head 222 is provided with a suction area 282, which is connected through an external port 284 to receive gaseous refrigerant from the accumulator 218 downstream of the evaporator 216. The suction area 282 is open to an intake port 286 in the valve plate assembly 280 at the working end of each of the cylinders 242 where the refrigerant is admitted to the respective cylinders on their suction stroke each through a reed valve formed integral with the suction valve disk at these locations. Then on the compression stroke, a discharge port 288 open to the working end of each cylinder 242 allows the compressed refrigerant to be discharged into a discharge area 290 in the head 222 by a discharge reed valve which is formed integral with the discharge valve disk. The compressor's discharge area 290 is connected to deliver the compressed gaseous refrigerant to the condenser 212 from whence it is delivered through the orifice tube 214 back to the evaporator 216 to complete the refrigerant circuit as shown in FIG. 9.

The wobble plate angle and thus compressor displacement can be controlled by controlling the refrigerant gas pressure in the sealed interior 278 of the crankcase behind the pistons 244 relative to the suction pressure. In this type of control, the angle of the wobble plate 250 is determined by a force balance on the pistons 244 wherein a slight elevation of the crankcase-suction pressure differential above a suction pressure control set-point creates a net force on the pistons 244 that results in a turning moment about the wobble plate pivot pins (not shown) that acts to reduce the wobble plate angle and thereby reduce the compressor capacity.

An important element of the variable displacement compressor is a pneumatic control valve 300 inserted into the head portion 222 of the compressor. CV 300 senses the A/C load by sensing the pressure state (the suction pressure) of the refrigerant gas returning to the compressor. The CV is operably connected to the crankcase chamber 278. There are channels in the cylinder block 220 and the head 222 of the compressor for gas flow between the CV and suction area 282, discharge area 290 and crankcase chamber 278 of the compressor. The CV controls the displacement of a piston 244 within the compressor by controlling the pressure of gas in the crankcase chamber 278 that acts on the backside of the pistons 244 and the wobble plate 250.

Control valve 300 inserts into a stepped, blind CV cavity 298 formed in the compressor head 222. The blind end of CV cavity 298 communicates directly with discharge area 290 through port 292. CV cavity ports 294 and 295 communicate with the crankcase chamber 278. CV cavity port 296 communicates with the suction area 282. CV 300 is sealed into the CV cavity 298 so that particular features of the CV align with ports 292, 294, 295 and 296.

FIG. 10 illustrates, in more detail, the pneumatic CV 300 depicted in FIG. 9. The valve 300 comprises a valve body 310 and valve bellows cover 312. Grooves 314, 316 and 318 are formed in the valve body to position o-rings, which seal against the walls of the CV cavity 298. A groove 299 formed in the wall of the CV cavity 298 holds an o-ring, which seals against the valve bellows cover 312. This arrangement of o-rings seals the valve into four regions within the CV cavity 298 that are sealed with respect to each other and are each in gas communication with one of ports 292, 294, 295 or 296.

CV 300 has an upper valve chamber 330 that communicates to the compressor discharge area 290 via (through) filter 320 and CV cavity port 292. A mid-valve chamber 322 communicates to the crankcase chamber 278 via an opening 321 in the valve body 310. A central passageway 326 in the valve body 310 communicates with the crankcase chamber 278 via port 295. A lower valve chamber 328 communicates with the compressor suction area 282 through opening 327 in the valve bellows cover 312 and via port 296.

CV 300 has a ball valve comprising ball 332 and valve seat 334 that can be operated to control the flow communication path between upper valve chamber 330 and mid-valve chamber 322, hence controlling the flow communication between the discharge area 290 and the crankcase chamber 278 of the compressor. CV 300 has a conical valve consisting of conical member 340 and matching conical valve seat 338 that can be operated to control the flow communication between lower valve chamber 328 and central passageway 326, hence controlling the flow communication between the suction area 282 of the compressor and the crankcase chamber 278.

The conical valve member 340 is formed as a shoulder near one end of a valve rod 336. The other end of valve rod 336 is arranged to push against ball 332 as the conical valve member 340 is seated against the matching conical valve seat 338. With this arrangement, the movement of the valve rod 336 opens and closes the flow communication of both discharge pressure and suction pressure gas to the crankcase chamber 278. The positioning of valve rod 336 can be used to adjust the crankcase pressure to values between suction pressure and discharge pressure. This adjustment of the crankcase pressure, in turn, adjusts the compressor displacement.

In conventional pneumatic CV 300, the position of valve rod 336 is established by a balance of forces arising from the discharge pressure acting on ball 332, a pressure sensitive bellows actuator 350, ball centering spring 354 and bias spring 352. Bellows actuator 350 is comprised of an evacuated metal bellows 342, an internal spring 344, end caps 345 and 346, and bellows stem 348. The bellows actuator 350 is extended by the force of internal spring 344 and is contracted by the force of gas pressure applied to the external surface of the bellows. Bellows actuator 350 is sealed in lower valve chamber 328 that is in gas communication with the suction area 282 of the compressor.

During operation of the compressor, CV 300 responds to changes in the suction pressure of the compressor 210 via the bellows actuator 350, and to changes in the discharge pressure via the force on ball 332. The spring constants and nominal compression of the bellows internal spring 344, bias spring 352 and ball centering spring 354 create forces on valve rod 336 that are set by the valve manufacturer at the time of valve assembly. The spring forces act to normally condition control valve 300 so as to open the flow of discharge pressure gas and simultaneously to close the flow to the suction area 282 from the crankcase chamber 278. CV 300 will therefore control the flow of discharge and suction pressure gasses to the compressor crankcase 278 according to these fixed spring forces.

The nominal spring bias force set-up design parameters in a pneumatic CV such as CV 300 are chosen so that during operation of the air conditioning system, the temperature of the evaporator is maintained slightly above the freezing point of water. The spring bias set-up requires a balancing of system objectives that apply under different air temperature ambient conditions. For higher air temperature ambient conditions, it is optimal to maintain as cold an evaporator as possible without freezing. At lower ambient air temperatures, it is desirable to maintain as high an evaporator temperature as can be maintained while still supplying some dehumidification. One choice of spring bias forces for CV 300 must accommodate to multiple ambient air temperature conditions, engine power loading conditions, and user demands for cooling.

Pneumatic CV's with fixed spring force bias set-up designs have two major disadvantages. First, the system is always working at its maximum capacity at the evaporator requiring maximum energy use by the compressor when the cooling system is operating. Second, since the evaporator is always at maximum capacity, hot air must be introduced into the system to temper the cold air to a temperature other than full cold.

An alternate CV design used in variable displacement compressors for vehicle air conditioning system utilizes a solenoid-assisted valve to control the flow of refrigerant gas into the crankcase of a variable displacement compressor. U.S. Pat. No. 5,964,578 by Suitou, et al (Suitou '578), discloses a CV having a solenoid-activated rod that operates on a valve member that controls the flow of discharge and suction pressure gasses to the crankcase. The valve member position is partially established by a spring-biased bellows in similar fashion to a conventional pneumatic CV. Increasing suction pressure acts on the bellows to reduce gas flow from the discharge area to the crankcase. When energized, the solenoid activated rod applies a force that also urges the valve member so as to reduce discharge pressure flow to the crankcase. This allows an additional control of the piston stroke and the output capacity of the compressor that can be mediated by electrical signals to the solenoid coils.

An alternate CV design using a solenoid actuator to assist discharge valve operation has been disclosed in U.S. Pat. No. 5,702,235 by Hirota (Hirota '235). In this design, a solenoid is used to open and close a pilot valve that admits discharge pressure gas to a pressurizing chamber in the CV. The pressurizing chamber is in constant gas communication with the suction pressure area of the compressor. A valve member controls the flow of discharge and suction pressure gasses to the crankcase. The position of the valve member is established by a balance of spring bias forces, the force of the discharge pressure acting on an end of the valve member, and the force of the pressure in the pressurizing chamber acting on the opposite end of the valve member. When energized, the solenoid activated pilot valve allows the pressure to rapidly increase in the pressurizing chamber, opening the valve member to increase the flow of discharge pressure gas to the crankcase.

The valve member of the Hirota '235 CV design does not respond to the suction area pressure and does not control compressor displacement according to a suction pressure set-point as does the solenoid-assisted CV of Suitou '578 or the pneumatic CV of Skinner '718. The object of the Hirota '235 CV design is to use the force of discharge pressure gas to open the discharge to crankcase valve, thereby allowing the use of a compact, lightweight and inexpensive solenoid.

There are several major disadvantages with the prior art solenoid-assisted CV's. First, a variable position solenoid is required. Variable position solenoids are not linear in performance and the extreme temperatures in an automobile engine compartment make proper operation of the variable position solenoid highly difficult given power constraints. Second, a large and precise current value is required to properly position the solenoid. Third, variable position solenoid systems do not provide a steady suction pressure set-point whereby the cooling system can maintain itself in a state of equilibrium.

As a solution to the inefficiencies of conventional pneumatic and solenoid-assisted CV's, a CV design is needed in which the set-up of the bias forces acting within a pneumatic valve control valve can be changed to optimize the performance of the cooling system under different conditions. That is, a variable set-point control valve (VCV) is needed which varies the degree of displacement of the piston in the compression chamber. The suction pressure set-point is varied by the VCV according to the temperature desired by the occupants of the passenger compartment. In this manner, the cooling system does not have to operate at its maximum at all times, but rather the compressor only compresses and pumps enough the refrigerant gas to the suction pressure set-point necessary to cool the air flow to the temperature defined by the occupants. Substantial energy is saved by pressurizing the gas only to the point required and pumping only the volume required, and efficiencies are realized by eliminating the introduction of hot air into the cooled air flow.

A variable set-point CV is needed which overcomes the drawbacks of conventional pneumatic and solenoid-assisted CV's and enables a cooling system that maintains a steady-state equilibrium to match the needs of the passengers in the passenger compartment while operating efficiently.

A variable set point control valve (VCV) 10 is represented in the diagram of FIG. 1 according to the prior art disclosed in U.S. Pat. No. 6,390,782, the disclosure of which is hereby incorporated herein by reference. In FIG. 1, VCV 10 is depicted in cross-sectional view and has a shape and feature placements appropriate to fit the control valve cavity 298 of the Skinner '718 variable displacement compressor described previously (see FIG. 9). VCV 10 is coupled to a compressor 100, which compresses a gas. VCV 10 controls the amount of gas and the degree to which it is pressurized in compressor 100. In the preferred embodiment, the gas compressed in compressor 100 is a refrigerant such as is used in an air conditioning unit. For instance, such an air conditioning unit would be found in an automobile.

VCV 10 comprises a compressor displacement control portion 30 and a variable set point control portion 80. Compressor displacement control portion 30 controls the flow of the gas from compressor 100 in and out of VCV 10 while variable set point control portion 80 controls the operation of compressor displacement control portion 30. VCV valve body 12 is formed with many VCV functional elements, which will be described later. In the preferred embodiment illustrated in FIG. 1, valve body 12 is substantially cylindrical in shape as may be inferred from the cross-sectional view shown. O-ring retaining grooves 14 are indicated on the exterior of valve body 12 in three locations. When VCV 10 is inserted into a control valve cavity of a compressor (see for example, FIG. 9), it is assembled with o-ring seals that allow different pressure sources to be communicated to different portions and ports of VCV 10.

Compressor displacement control 30 comprises a suction pressure chamber 32 formed in the lower end 16 of valve body 12 which is in gas communication with the suction area 120 of the compressor 100 through VCV suction port 34 formed in valve body 12 and suction pressure path 112. Refrigerant circuit line 111 feeds low pressure gas into a compression chamber 114 of compressor 100 via the suction area 120 and a compressor valve plate 126. Refrigerant circuit line 111 is a line returning low pressure refrigerant gas from the accumulator 144 of an air conditioning system.

Compressor 100 further comprises piston 116, crankcase chamber 118, and discharge area 124. In simple terms, the operation of compressor 100 is as follows. The refrigerant gas in compression chamber 114 is compressed by the stroke of piston 116 as piston 116 moves towards the compressor valve plate 126. The compressor valve plate admits high pressure gas to the discharge area 124. The refrigerant circuit line 111 is connected to the discharge area 124. The greater the displacement (stroke) 128 along compression chamber 114 of piston 116, the greater the pressure and flow volume of the refrigerant gas as it passes through compressor valve plate 126. The refrigerant gas then passes from refrigerant circuit line 111 to a condenser 140 where it condenses to a liquid in the condenser coils. The liquid then flows to an evaporator 142, where the liquid expands at an orifice within the evaporator 142, and evaporates. The air passing over the coils gives off heat energy that provides the energy for the state change from liquid to gas The cooled air is then blown into the passenger cabin of the automobile, or into whatever chamber the air conditioning system is required to cool. After expanding, the refrigerant gas is in a low pressure state and is returned to compressor 100 through the refrigerant circuit line 111.

Compressor 100 is a variable compressor, meaning that the stroke of piston 116 varies dependent upon the required air conditioning system load. For instance, if a user requires additional cooling of the air passing over the evaporator coils, the flow volume of the refrigerant discharged into refrigerant circuit line 111 is increased. The stroke 128 of piston 116 is increased to increase the flow volume.

A pressure is applied within crankcase chamber 118 to the back of piston 116. The greater the pressure within crankcase chamber 118, relative to the suction pressure, the shorter the return stroke 128 of piston 116 after compression due to the high pressure force exerted against piston 116 on the return (away from valve plate 126). Conversely, the lower the pressure within crankcase chamber 118, relative to the suction pressure, the greater the return stroke of piston 116 after compression due to the low pressure force exerted against piston 116. By varying the pressure within crankcase chamber 118, thus varying the displacement 128 of piston 116 and ultimately the pressure of the discharge through refrigerant circuit line 111, the temperature of the air from the evaporator is controlled.

The compressor displacement control portion 30 has a middle chamber 40 formed as a bore centered in valve body 12 leading from suction pressure chamber 32. A first middle port 42 is formed in valve body 12 and communicates with middle chamber 40. First middle port 42 is in gas communication with the crankcase chamber 118 through a first crankcase pressure path 130. VCV 10 further comprises a pressure sensitive member, diaphragm 36, exposed to suction pressure chamber 32. A suction pressure valve, comprising a suction valve closing member, suction valve ball 38, and a suction valve seat 37 formed in valve body 12, is provided to open and close a gas communication path between the suction pressure chamber 32 and the middle chamber 40.

Suction valve ball 38 is urged against suction valve seat 37 by rigid member 41, which is in floating contact with diaphragm 36. A bias spring 44, retained in middle chamber 40, urges suction valve ball 38 off suction valve seat 37, that is, urges the suction valve portion to open. It is also seen that the bias spring 44 opposes a movement of the diaphragm towards the suction valve seat and so acts as an equivalent pressure, a spring bias pressure, adding to the action of the suction pressure on the pressure receiving area of diaphragm 36. The VCV suction pressure valve opens and closes a gas communication path between the suction area 120 and the crankcase chamber 118 of compressor 100.

A discharge pressure valve portion of VCV 10 is comprised of a discharge valve member, discharge valve ball 50, and discharge valve seat 52 formed in valve body 12. Discharge valve ball 50 is positioned in a discharge pressure chamber 60 formed in an upper end 18 of valve body 12. Valve insert 64 has a stepped throughbore 62 that positions discharge valve ball 50 in alignment with discharge valve seat 52. A ball centering spring 58 may be used to further condition the nominal position of discharge valve ball 50. A particle filter cap 74 sealably covers the end of valve body 12, completing discharge pressure chamber 60. When VCV 10 is inserted into the compressor 100, the upper end 18 of the valve body is sealed in a blind end of a control valve cavity such as cavity 298 illustrated in FIG. 9. Discharge pressure path 110 from the discharge area 124 of the compressor is communicated to the blind end of the control valve cavity. Discharge pressure gas is thereby communicated to the VCV discharge pressure chamber 60 through filter 74.

VCV 10 has a central stepped bore 70 through valve body 12. Central bore 70 has a large diameter bore portion at the upper end adjacent the discharge chamber 60 whereat discharge valve seat 52 is formed. Central bore 70 and middle chamber 40 are aligned with each other. A second middle port 56 is formed in valve body 12 and communicates with the large bore portion of central bore 70. Second middle port 56 is in gas communication with the crankcase chamber 118 through second crankcase pressure path 132. When discharge valve ball 50 is moved off discharge valve seat 52, discharge pressure gas can flow through bore 70 to second middle port 56 and then to the crankcase chamber 118 via second crankcase pressure path 132.

A valve rod 54, inserted in central bore 70 partially links the actions of the suction valve portion and the discharge valve portions of the VCV. Valve rod 54 has a diameter slightly smaller than the small bore portion of central bore 70. Valve rod 54 freely slides in central bore 70 yet substantially blocks gas communication between middle chamber 40 and discharge chamber 60. The length of valve rod 54 is chosen so that it simultaneously touches seated discharge valve ball 50 and suction valve ball 38 in a fully open (fully unseated) position. This arrangement links the suction and discharge valve portions in a partial open-close relationship. As suction valve ball 38 moves in a valve-closing direction, valve rod 54 pushes discharge ball 50 in a valve-opening direction. As discharge valve ball 50 moves in a valve closing direction, valve rod 54 pushes suction ball 38 in a valve-opening direction.

In the preferred embodiment of FIG. 1, valve rod 54 is not attached to either valve closing ball. Valve rod 54 operates to open either the discharge or the suction valve portions of the VCV but not to close either. The forces which act to close the discharge valve portion are the pressure of the discharge gas on an effective pressure receiving area of discharge valve ball 50 and a small spring force imparted by ball centering spring 58. The force that acts to close the suction pressure valve portion derives from a movement of pressure sensitive diaphragm 36 via rigid member 41. Other embodiments of the prior art of U.S. Pat. No. 6,390,782 in which both valve closing members are attached to a coupling means such as valve rod 54 will be apparent to those skilled in the control valve art. If both valve members are rigidly linked, then a full open-close relationship will exist.

Reference is made specifically now to the variable set point control portion 80 of VCV 10. Variable set point control 80 comprises a closed reference chamber 90 bounded by VCV diaphragm 36, walls 91 formed at the lower end 16 of valve body 12 when the suction pressure chamber 32 was formed, and valve end cap 20. Diaphragm 36 is positioned and sealed against an interior step 93 in the suction pressure chamber 32 by a reference valve carrier 81. The diaphragm 36 has a first side 43 with a suction pressure receiving area exposed to suction pressure in suction pressure chamber 32 and a second side 39 with a reference pressure receiving area exposed to the reference pressure in the reference chamber. Diaphragm 36 is arranged to seal the reference chamber 90 from direct gas communication with the suction pressure chamber 32, the discharge pressure chamber 60, middle chamber 40 or central bore 70.

Two pressure bleed passageways, a discharge bleed passageway 68 and a suction bleed passageway 72 are provided in valve body 12 and align with two holes in the diaphragm 36 that is sealed against valve body interior step 93. Valve insert 64 has a valve insert bleed hole 69 provided to communicate discharge chamber 60 with discharge bleed passageway 68. The bleed passageways, valve insert bleed hole, and corresponding diaphragm holes, provide a source of suction pressure gas and discharge pressure gas to the reference chamber 90. The feature depicted of supplying the discharge pressure gas to the reference chamber from VCV discharge pressure chamber 60 is important because this design uses filter 74 to protect the components and passages in reference chamber 90 from foreign material.

The VCV components contained in the reference chamber are illustrated more clearly in FIG. 2. Reference chamber valve means are further illustrated at higher detail level in FIG. 3. Same elements in FIGS. 1–3 are labeled with the same numbers.

Referring now to FIGS. 1–3, the reference valve carrier 81 is formed as a thick-walled cylinder with outside walls that sealably fit against the interior of walls 91 formed at the lower end 16 of valve body 12. The upper end of reference valve carrier 81 seals against diaphragm 36. Two small blind chambers, a suction bleed chamber 96 and a discharge bleed chamber 98 are formed in the reference valve carrier 81 from the upper end that is sealed against the diaphragm 36. The open end of suction bleed chamber 96 aligns with suction bleed passageway 72 and the open end of discharge bleed chamber 98 aligns with discharge bleed passageway 68. Reference chamber valve means are generally indicated as reference inlet valve 88 and reference outlet valve 86.

Turning to FIG. 3, reference inlet valve 88 is comprised of reference inlet valve closing member 162, reference inlet through hole 160, and reference inlet valve seat 164. Reference inlet through hole 160 is formed from an interior surface of the cylindrical reference valve carrier 81 through to discharge bleed chamber 98. Reference inlet valve seat 164 is formed around the inlet through hole 160 where it emerges from reference valve carrier 81 that is into reference chamber 90. The reference inlet valve closing member 162 is attached to an inlet valve push rod 167, which is part of inlet solenoid actuator 94. When an electrical current signal is applied to inlet solenoid leads 85, inlet valve push rod 167 is pulled into the center of solenoid actuator 94, urging reference inlet valve closing member 162 against reference inlet valve seat 164, closing off reference inlet through hole 160. Reference inlet through hole 160 communicates reference chamber 90 with discharge bleed chamber 98. Thus, opening and closing reference inlet valve 88 by means of electrical signals applied to inlet solenoid actuator 94 controls the flow of discharge pressure gas to the reference chamber.

Inlet solenoid leaf spring 168 is arranged to bias inlet valve push rod in a retracted position as is illustrated in FIG. 3. This inlet solenoid spring bias configuration means that the reference inlet valve 88 will open the reference chamber to the flow of discharge pressure gas in the absence of an electrical signal to energize the coil of the inlet solenoid actuator 94. The depicted reference inlet valve is said to be normally open the opposite arrangement of spring biasing the reference inlet valve to a normally closed condition is an alternate configuration of the reference inlet valve means that may also be employed successfully in another embodiment of the prior art of U.S. Pat. No. 6,390,782.

Reference outlet valve 86 is comprised of reference outlet valve closing member 172, reference outlet through hole 170, and reference outlet valve seat 174.

Reference outlet through hole 170 is formed from an interior surface of the cylindrical reference valve carrier 81 through to suction bleed chamber 96. Reference outlet valve seat 174 is formed around the outlet through hole 170 where it emerges from reference valve carrier 81 that is into reference chamber 90. The reference outlet valve closing member 172 is attached to an outlet valve push rod 177, which is part of outlet solenoid actuator 92. When an electrical current signal is applied to outlet solenoid leads 87, outlet valve push rod 177 is pulled into the center of solenoid actuator 92, pulling reference outlet valve closing member 172 away from reference outlet valve seat 174, opening reference outlet through hole 170. Reference outlet through hole communicates the reference chamber 90 with suction bleed chamber 96. Thus, opening and closing reference outlet valve 86 by means of electrical signals applied to outlet solenoid actuator 92 controls the flow of suction pressure gas to the reference chamber.

Outlet solenoid leaf spring 178 is arranged to bias outlet valve push rod in an extended position as is illustrated in FIG. 3. This outlet solenoid spring bias configuration means that the reference outlet valve 86 will close the reference chamber to the flow of suction pressure gas in the absence of an electrical signal to energize the coil of the outlet solenoid actuator 92. The depicted reference outlet valve is therefore normally closed. The opposite arrangement of spring biasing the reference outlet valve to a normally open condition is an alternate configuration of the reference outlet valve means that may also be employed successfully in another embodiment of the prior art of U.S. Pat. No. 6,390,782

It should also be appreciated that, while solenoid actuators are discussed herein and depicted in FIGS. 1–3, any electrically-driven physical actuator means could be employed to open and close reference inlet valve 88 and reference outlet valve 86.

The variable set point control portion 80 further comprises an electronic control unit 82, pressure sensor 84, electrical circuit carrier 83, and VCV electrical leads 89. Pressure sensor 84 is an optional feature of the preferred embodiment of the prior art of U.S. Pat. No. 6,390,782. It is a transducer device that produces an electrical signal that is related to a gas pressure impinging on its sensitive and Pressure sensor 84 is mounted on electrical circuit carrier 83 so as to respond to the gas pressure within closed reference chamber 90. It is not necessary for the practice of the prior art of U.S. Pat. No. 6,390,782 that pressure sensor 84 be mounted directly in the interior of reference chamber 90. An alternative embodiment could mount the pressure sensor at some other position as long as the pressure sensitive portion of the sensor is brought into gas communication with the reference chamber 90.

Electronic control unit 82 is an optional feature of the preferred embodiment of the prior art of U.S. Pat. No. 6,390,782. Control unit 82 may contain electronic circuitry to control the reference chamber valve means or to receive and process the electrical signals produced by the pressure sensor 84. In a preferred embodiment of this optional feature of the prior art of U.S. Pat. No. 6,390,782, the electrical components of control unit 82 are co-located with pressure sensor 84 by means electrical circuit carrier 83. Other functions of optional control unit 82 will be described later.

VCV electrical leads 89 are routed from electrical circuit carrier 83 through a sealed opening in valve end cap 20. The number of electrical leads needed by VCV 10 will depend on the functions performed by optional electronic control unit 82 and the device characteristics of optional pressure sensor 84. When neither electrical control unit 82 nor reference chamber pressure sensor 84 are employed, then VCV electrical leads 89 need comprise only those needed to carry electrical signals to activate the reference chamber valve means.

Variable set point control portion 80 controls the operation of compressor displacement control portion 30. By controlling a pressure within reference chamber 90, variable set point control 80 is able to regulate the open/close conditions of the suction pressure valve portion and the discharge pressure valve portion of VCV 10. For instance, if the pressure in reference chamber 90 exerts a force against diaphragm 36 which is less than the force exerted by the pressure in suction pressure chamber 32 and bias spring 44, diaphragm 36 will distort into reference chamber 90, that is in the direction of reference inlet let actuator 94. This motion moves suction valve ball 38 from suction valve seat 37, thus opening the flow of gas from first crankcase pressure path 130 to suction pressure chamber 32. At the same time, the discharge pressure valve portion is closed by the pressure of discharge gas forcing discharge valve ball 50 onto discharge valve seat 52. By opening the flow through the suction valve portion of VCV 10, gas from crankcase chamber 118 will flow into suction pressure chamber 32 and out to the suction area 120 of compressor 100 via suction pressure path 112. With the bleeding of gas out of crankcase chamber 118, less force is exerted on piston 116 giving piston 116 greater displacement. The flow of refrigerant gas flowing into the evaporator of the system is thus increased.

If the pressure in reference chamber 90 exerts a force against diaphragm 36 which is greater than the force exerted by the pressure in suction pressure chamber 32 and bias spring 44, diaphragm 36 will distort into the suction pressure chamber 32, that is, in the direction of suction valve seat 37. This action closes the VCV suction valve portion and, at the same time, opens the VCV discharge valve portion by pushing discharge valve ball 50 away from discharge valve seat 52 by means of valve rod 54. As the discharge valve portion is opened, high pressure gas from discharge pressure path 110 flows through discharge pressure chamber 60, stepped central bore 70, second middle port 56 and second crankcase pressure path 132 to crankcase chamber 118. Pressure will build up in crankcase chamber 118, thus applying a force against piston 116. The displacement 128 of piston 116 is thus restricted and the amount of refrigerant gas passing into the evaporator of the system is reduced.

The force that bias spring 44 exerts on the diaphragm is an important design variable for the overall performance of VCV 10. It has been found through experimentation that it is most beneficial if the spring force is adjusted to be equivalent to from 2 to 20 psi of suction pressure, and most preferably, from 4 to 10 psi. This range of spring bias force allows for sufficient operational range of VCV 10 in the condition of very low compressor capacity usage, that is, when the compressor is near full de-stroke operation.

The pressure within reference chamber 90 is controlled by the opening and closing of reference outlet valve 86 and reference inlet valve 88. Each of these are optionally controlled, in the preferred embodiment, by pressure sensor 84 and electronic control unit 82. Specifically, the pressure within reference chamber 90 is in gas communication with pressure sensor 84. Pressure sensor 84, interfaced to electronic control unit 82, measures the pressure of the gas in reference chamber 90 and communicates that pressure to electronic control unit 82. Electronic control unit 82 receives control signals and information from a compressor control unit 146. Passenger comfort level settings and other information about environmental conditions and vehicle operation conditions are received by compressor control unit 146. Compressor control unit 146 uses stored compressor performance algorithms to calculate a necessary amount of gas to be compressed within the compression chamber 114 by piston 116 to cause a desired condition to occur, namely that the passenger comfort level settings are optimally achieved within the constraints imposed by environmental and vehicle operational factors.

The calculated compressor displacement requirements, the pressure information from pressure sensor 84, and known physical response characteristics of VCV 10 elements are utilized by VCV performance algorithms to calculate a necessary pressure within reference chamber 90 to meet the compressor displacement requirements. This calculated reference pressure, necessary to meet the requirements determined by the compressor control unit, is called a predetermined reference pressure. The variable displacement compressor 100 is thereby controlled by the determining of the predetermined reference pressure and the maintenance of the gas pressure in the reference chamber to this predetermined pressure level.

Alternatively, if a pressure sensor 84 is not employed, the predetermined reference pressure may be selected from a stored set of reference pressure levels that has been pre-calculated based on the known nominal characteristics of VCV 10 or, in addition, customized for each VCV by means of a calibration set-up procedure. In the case of this alternate embodiment of the prior art of U.S. Pat. No. 6,390,782, the calculated compressor displacement requirements are used to determine, in look-up table fashion, the predetermined reference pressure that is optimal for achieving the desired compressor displacement control.

Control of reference outlet valve 86 and reference inlet valve 88 comes from electronic control unit 82 through actuators 92 and 94, respectively. Dependent upon the outputs of the algorithms within electronic control unit 82, electronic control unit 82 will open and close reference outlet valve 86 by actuating outlet actuator 92 and open and close reference inlet valve 88 by inlet actuator 94. For instance, when the pressure within reference chamber 90 is to be increased, inlet actuator 94 will retract reference inlet valve member 162 allowing high pressure gas to flow from discharge pressure chamber 60 through valve insert bleed hole 69, discharge pressure bleed passageway 68 and discharge bleed chamber 98 into reference chamber 90. At the same time, outlet actuator 92 closes reference outlet valve 86, thus allowing the pressure in reference chamber 90 to increase. Inversely, to decrease the pressure in reference chamber 90, electronic control unit 82 will actuate outlet actuator 92 to retract reference outlet valve member 172 to open flow from reference chamber 90 through suction bleed chamber 96 to suction pressure bleed passage 76 to suction pressure chamber 32, thereby bleeding off pressure. At the same time, actuator 94 is signaled by electronic control unit 82 to extend reference inlet valve member 162 to close off discharge pressure flow into reference chamber 90.

By controlling the pressure within reference chamber 90 to the predetermined reference pressure, electronic control unit 82, through actuators 170 and 172, controls the deflection of diaphragm 36, thus controlling the varying of displacement 128 of piston 116. For the preferred embodiment depicted in FIGS. 1–3, the reference chamber pressure can be continuously or periodically monitored by means of pressure sensor 84. This pressure information can be used as a feedback signal by control unit 82 in a pressure servo control algorithm to maintain the reference chamber at the predetermined reference pressure within chosen error boundaries.

It is anticipated that an important benefit of the VCV design disclosed herein is the ability to maintain valve control performance by tightly maintaining the predetermined reference pressure. The disclosed design also enables the system to electronically change the predetermined reference pressure to a different value, thereby changing the suction pressure set-point about which the variable displacement compressor operates. This allows the vehicle to adjust the compressor control in the face of changing environmental factors to achieve a desired balance of passenger comfort and vehicle performance. In order to realize these benefits to the fullest, the control of the pressure in the reference chamber must be sufficiently responsive.

The responsiveness of the reference pressure control system depends in part on the characteristics of the flow of discharge pressure gas through inlet valve 88 and the flow out of outlet valve 86 to suction pressure. FIG. 4 illustrates some important geometrical feature details of reference inlet valve 88 and reference outlet valve 86.

Referring first to FIG. 4A, inlet valve closing member 162 is illustrated in a fully closed position holding off the force of discharge pressure gas impinging an effective pressure receiving area, $A_I$, on inlet valve member 162. Also indicated in FIG. 4A is the diameter, $D_I$, of the reference inlet port 160 leading from the discharge bleed chamber 98. A large value of $D_I$ will promote quick response to commands to increase reference chamber pressure by admitting a large flow of discharge pressure. The size of $D_I$ needed to achieve a given reference chamber pressure rise time will depend on the reference chamber gas volume. A larger reference inlet port 160 will be required for a larger reference chamber gas volume to achieve the same increase in reference chamber pressure rise time as for a smaller reference chamber gas volume.

However, a large value of $D_I$ necessitates a correspondingly large value of $A_I$, the effective inlet valve member pressure receiving area. This, in turn, would mean that the closing force that would be needed from the inlet valve actuator 94 would also be large. A large closing force might require a physically large actuator or require excessive power to maintain the inlet valve in a closed state. Consequently, the choice of the reference inlet port 160 diameter, $D_I$, and the pressure receiving area, $A_I$, involves a balance of competing requirements.

The effective inlet valve member pressure receiving area, $A_I$, is the net, unbalanced, area of the inlet valve closing member that is exposed to the discharge pressure when the inlet valve is fully closed. That is, the area that effectively receives the force of the discharge pressure, $A_f$, may be calculated by measuring the force exerted on the inlet valve closing member by the discharge pressure, and dividing by the discharge pressure. It has been found through experimentation effective inlet valve pressure receiving area, $A_f$, may be beneficially chosen to be less than 30,000 square microns and preferably, less than 7500 square microns when the reference chamber gas volume is approximately 2 cm.sup.3. Under typical automotive air conditioner compressor operating conditions, a reference inlet valve closing force of less than 1 Lb. will suffice if the effective inlet valve member pressure receiving area, $A_f$, is less than approximately 7500 square microns.

Referring to FIG. 4B, outlet valve closing member 172 is illustrated in a fully open position with gas flowing out of reference chamber 90 through an effective gas flow area Many geometrical designs of the reference outlet port 170 may be chosen to have the same result in terms of the gas volume flow for a given pressure differential between reference chamber 90 and the suction bleed chamber 96. The effective flow area is chosen to balance competing performance characteristics. In order to insure quick response to a command to lower the reference chamber pressure, it is desirable to have a large outlet valve 86 effective flow area. On the other hand, to help restrain rapid pressure increases in the reference chamber when opening the inlet valve 88 to discharge pressure, and to bring down reference pressure overshoots that may occur, it is helpful to have a small outlet valve 86 effective flow area.

The effective gas flow area of the reference outlet valve 86 may be beneficially chosen as a ratio to the effective flow area of the inlet valve 88. Alternatively, the diameter, $D_O$, of the reference outlet port 170, may be chosen as a ratio of the reference inlet port 160 diameter, $D_I$. It has been determined by experimentation and analysis that the beneficial range of the ratio DO to $D_I$ is from 0.5 to 5.0, and, most preferably, from 0.7 to 2.0. The corresponding beneficial ratio of inlet-port to outlet-port cross-sectional areas, the inlet-to-outlet port areal ratio, is 0.25 to 25.0, and, most preferably, 0.5 to 4.0. When the geometries of inlet and outlet gas flow areas are more complex than the circular passageways illustrated in FIG. 4, the gas flow cross-sectional areas may be analyzed or experimentally determined and the inlet-to-outlet port areal ratio design guideline followed.

It has been found through experimentation, for example, that when the reference chamber 90 gas volume is approximately 2 cm.sup.3, a reference outlet port 170 diameter $D_O$ of 100 microns is an effective choice when the reference inlet port 160 diameter $D_I$ is 100 microns, a reference outlet port diameter to reference inlet port diameter ratio of 1.0. With these parameter values, and under typical automotive air conditioner compressor operating conditions, the reference chamber pressure can be controllably changed, or tracked to a predetermined reference pressure, at the rate of 10 psi/second.

For alternative embodiments of VCV 10 without a pressure sensor, the compressor control unit 146 may periodically recalculate the compressor displacement conditions required to maintain performance of the cooling system. Based on the magnitude and time behavior of changes in these calculations, compressor control unit 146 may send instruction signals to VCV electronic control unit 82 to increase or decrease the reference chamber pressure to re-establish the pre-determined reference pressure level. It will be appreciated by those skilled in the art that this method of affecting servo control of the pressure in the reference chamber to the predetermined level will be less timely than can be implemented using a direct measurement of reference chamber pressure. Nonetheless, this loose-servo method can be effective and appropriate for a low cost embodiment of the prior art of U.S. Pat. No. 6,390,782.

The functions attributed to VCV electronic control unit 82 and compressor control unit 146 could be performed by other computational resources within the overall system employing the VCV 10, compressor 100 and cooling equipment. For example, if the overall system is an automobile with a central processor, then all of the control information and calculations needed to select and maintain the predetermined reference pressure could be gathered and performed by the automobile central processor. Signals to and from pressure sensor 84 could be routed to an input/output (I/O) port of the central processor and reference inlet and outlet valve actuation signals could be sent to VCV 10 from another I/O port of the central processor. Alternately, a compressor control unit 146 could perform all the control functions needed to manage VCV 10. And finally, VCV control unit 82 could be provided with circuitry, memory and processor resources necessary to perform the compressor displacement requirement calculation as well as selecting and maintaining the predetermined reference pressure.

Another embodiment of the prior art of U.S. Pat. No. 6,390,782 is illustrated in FIG. 5. This embodiment is similar to the embodiment of FIG. 1 except that bias spring 44 is omitted and rigid member 41 is replaced with rigid alignment member 510. Rigid alignment member 510 is formed with a cavity that retains suction valve ball 38 by compression fit. Rigid alignment member 510 floats in the suction pressure chamber 32 and responds to the movement of diaphragm 36. In the embodiment of FIG. 5, VCV 500 operates in analogous fashion to VCV 10 in FIG. 1. The force exerted by bias spring 44 in FIG. 1 serves to push the suction valve portion farther open than would be achieved by simply reducing the reference pressure chamber all the way to suction pressure, fully retreating diaphragm 36. This bias spring force contribution is most important when opening the suction pressure valve portion of VCV 10 to rapidly reduce (dump) the pressure in the crankcase chamber 118 to increase compressor 100 capacity for rapid cooling.

In VCV 500 in FIG. 5 the suction valve ball 38 is nominally held in a maximum open condition by the set up of diaphragm 36 position, the dimensions of the rigid alignment member 510 and valve ball 38 assembly, and the position of suction valve seat 37. A higher predetermined reference pressure is needed to displace diaphragm 36 towards suction valve seat 37, to compensate for the maximum open set up. When maximum suction valve opening is needed to dump the crankcase chamber pressure, the predetermined reference pressure is reset back down to suction pressure, retreating diaphragm 36, and allowing the high pressure crankcase gas to push the suction valve portion to a maximum open condition.

FIG. 6 illustrates another embodiment of the prior art of U.S. Pat. No. 6,390,782. In this embodiment, the compressor 109 has an internal bleed passageway 108 that allows gas to bleed from the crankcase chamber 118 to the suction area 120 of compressor 109. VCV 600 in FIG. 6 is similar to VCV 10 in FIG. 1 except that it omits the suction pressure valve portion. VCV 600 also uses a valve piston 610 as the pressure sensitive member instead of a diaphragm. Valve piston 610 has a suction pressure receiving area 612 and a reference pressure receiving area 614. Valve piston 610 moves in a suction pressure chamber 620. Valve piston 610 is operably coupled to the discharge pressure valve portion by valve rod 54. VCV 600 operates in analogous fashion to VCV 10 in FIG. 1 except that discharge gas will be supplied to the crankcase chamber 118 on a nearly continuous basis except when the compressor 109 must operate at maximum displacement and the crankcase pressure is maintained at suction pressure. The reference chamber pressure control algorithms will be different for VCV 600 than for VCV 10 in FIG. 1 due to some leakage of reference chamber gas to suction pressure chamber 620 via gaps between piston 610 and the walls of suction pressure chamber 620.

FIG. 7 illustrates another embodiment of the prior art of U.S. Pat. No. 6,390,782. VCV 700 is configured to operate with compressor 109 having an internal bleed 108 between the crankcase chamber 118 and the suction area 120. It is similar to VCV 600 in FIG. 6 except that it uses a diaphragm 36 as a pressure sensitive member and rigid member 710 and valve rod 54 to operably couple the movement of diaphragm 36 to the discharge pressure valve portion VCV 700 operates in analogous fashion to VCV 600 in FIG. 6. The reference chamber pressure control algorithms used with VCV 700 are similar to those used with diaphragm-equipped VCV 500 and VCV 10 since there is no leakage of reference chamber gas to suction pressure outside the control of the reference chamber valve means.

FIG. 8 illustrates two additional embodiments of the prior art of U.S. Pat. No. 6,390,782. FIG. 8(a) shows an alternative embodiment of the reference chamber valve means illustrated in FIG. 3. The reference valve carrier 81 and inlet valve means 88 and inlet valve actuator 94 are unchanged. However in place of outlet valve means 86, a constant outlet bleed orifice 810 is provided. The predetermined reference pressure is set and maintained by actuating the reference inlet valve admitting discharge pressure gas. The reference pressure control algorithms used with this embodiment of the reference valve means are derived with cognizance of the characteristics of the constant bleed to suction pressure. With this arrangement a compromise must be struck between a desire to be able to rapidly change the predetermined reference pressure toward suction pressure, favoring a large bleed flow, and the controllability of higher predetermined reference pressure settings, favoring a small bleed flow.

FIG. 8(b) shows another alternative embodiment of the reference chamber valve means illustrated in FIG. 3. The reference valve carrier 81 and outlet valve means 86 and outlet valve actuator 92 are unchanged. However, in place of inlet valve means 88, a constant inlet bleed orifice 816 is provided. The predetermined reference pressure is set and maintained by actuating the reference outlet valve, releasing reference chamber gas to suction bleed chamber 96. The reference pressure control algorithm used with this embodiment of the reference valve means are derived with cognizance of the characteristics of the constant bleed of discharge pressure into the reference chamber. With this arrangement a compromise must be struck between a desire to be able to rapidly change the predetermined reference pressure toward discharge pressure, favoring a large bleed flow, and the controllability of predetermined reference pressure settings that are near suction pressure, favoring a small bleed flow.

Either alternate embodiment of the reference chamber valve means disclosed in FIG. 8 may be substituted for the dual inlet and outlet reference valve arrangements depicted in FIGS. 1–7. That is, any of VCV embodiments VCV 10, VCV 500, VCV 600, or VCV 700 could be constructed with either of the single actuator reference valve means embodiments disclosed in FIG. 8.

Thus, a variable set point control valve is described which variably controls the displacement of a piston within a gas compression system by controlling a reference pressure acting upon a pressure sensitive member. Utilizing actuators which open and close based upon input from control algorithms within a control unit to control the flow of high or low pressure gas, the pressure acting upon the diaphragm can accurately adjust the degree of displacement of the piston. This variable fine tuning of the pressure against the diaphragm, hence the fine tuning of the piston displacement control, allows the compression system to operate at less than maximum capacity, thus substantially increasing the efficiency of the compression system.

SUMMARY OF INVENTION

The present invention relates to a control device for a variable displacement compressor. The control device includes a microvalve operated control valve.

It is an objective of the present invention to provide a microvalve operated control valve used in variable displacement compressors, which valve maintains the pressure in the compressor crankcase in response to the suction pressure of the compressor relative to a stable, predetermined set-point of the suction pressure, which set-point can be changed during compressor operation by electrical signals.

The present examples and embodiments are to be considered as illustrative and not restrictive and the invention is not limited to the details given herein, but may be modified within the scope and equivalence of the appended claims.

These and other objects, features, and advantages of the present invention will become more apparent upon a consideration of the following description and drawings of the preferred embodiments of the present invention, and the claims.

Further, various objects, features, and advantages of this invention, beyond that discussed above, will become apparent to those skilled in the art from the following detailed description of the preferred embodiment, when read in light of the accompanying drawings.

BRIEF DESCRIPTION OF DRAWINGS

The invention will be described with reference to the drawings. In the drawings are:

FIG. 18 is a sectional view of a layer of a micro spool valve that is suitable for use as a microvalve in a microvalve operated control valve for a variable displacement compressor.

DETAILED DESCRIPTION

Figure 1:
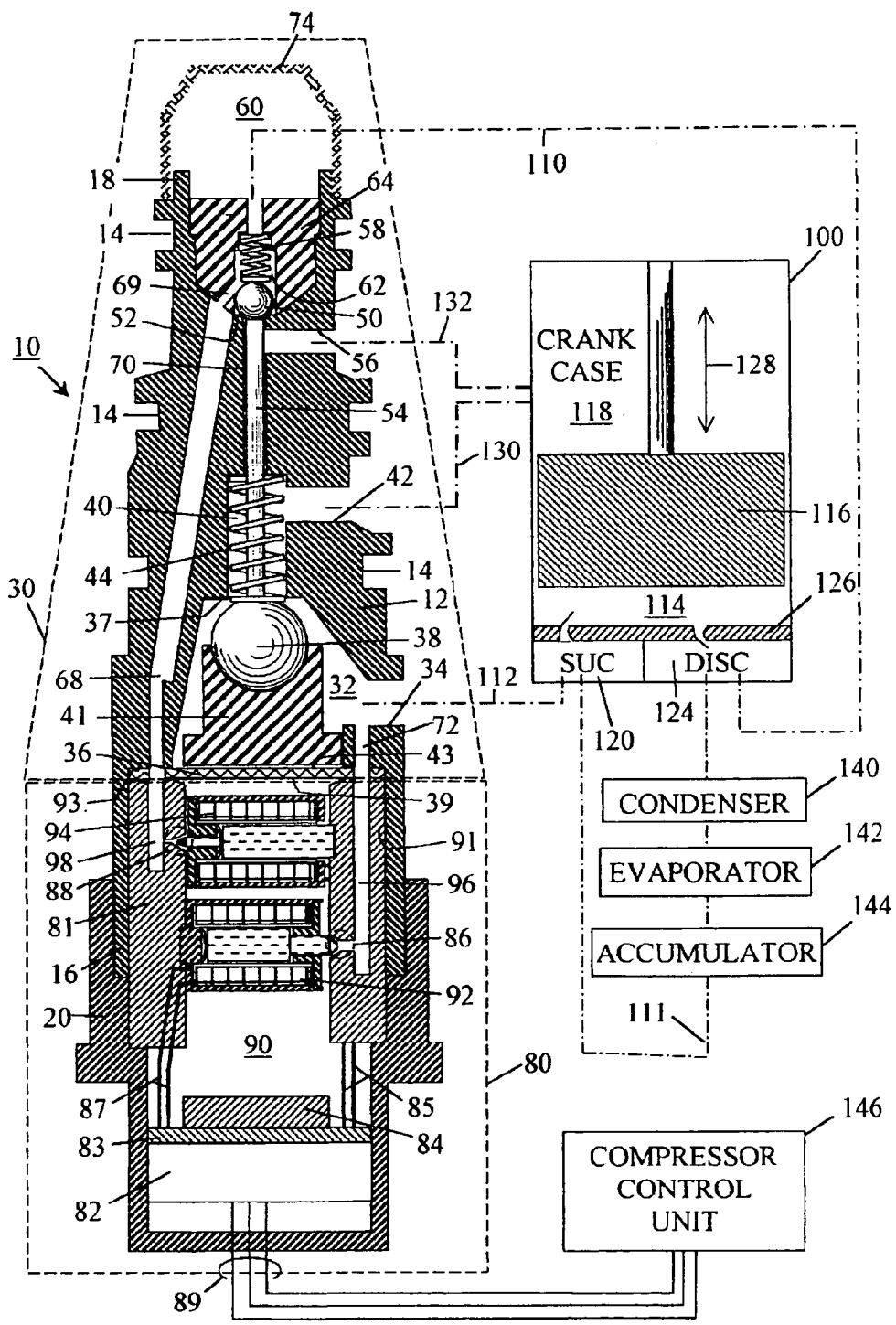
FIG. 1 shows a cross-section of a variable set point control valve according to a preferred embodiment of the prior art of U.S. Pat. No. 6,390,782.
Figure 2:
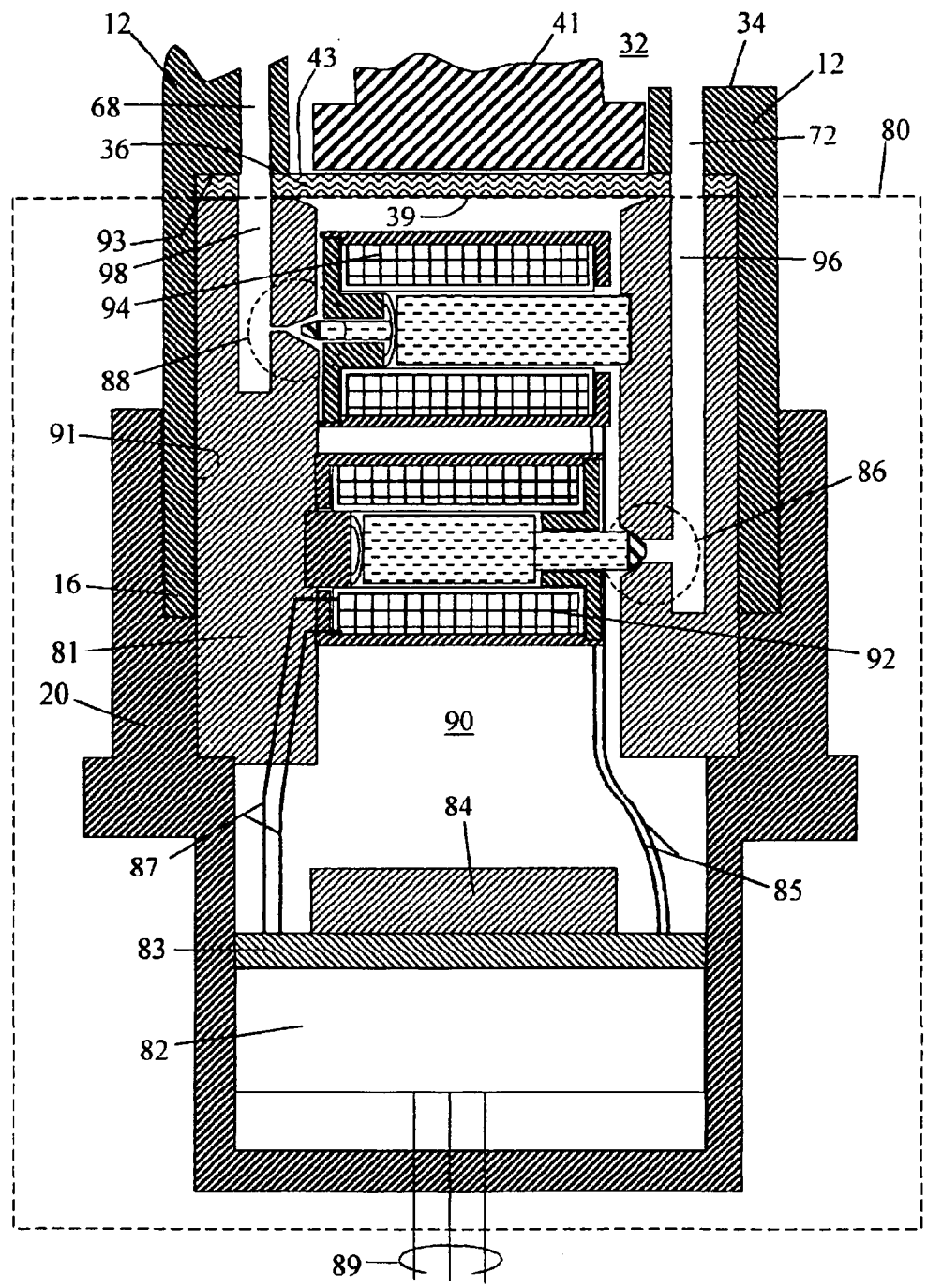
FIG. 2 shows a cross-section of the variable set point control portion of the variable control valve of FIG. 1.
Figure 3:
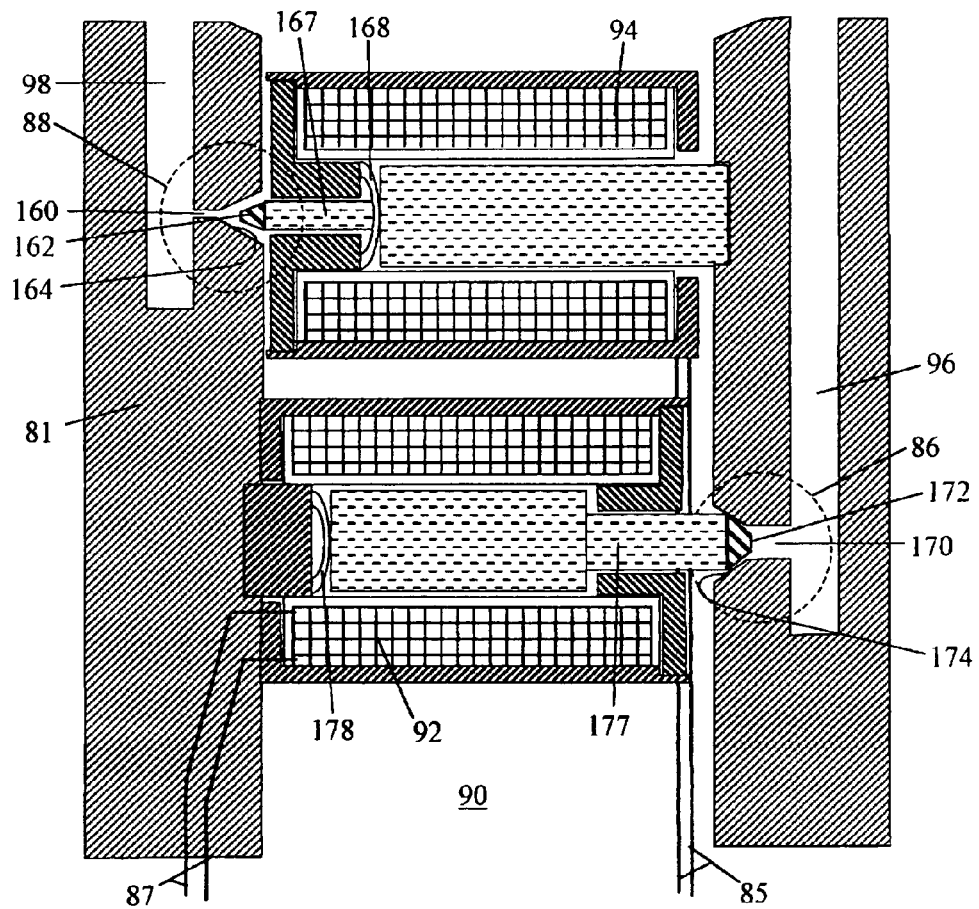
FIG. 3 shows a cross-section of the reference chamber valve means of the variable control valve of FIGS. 1 and 2.
Figure 4A:
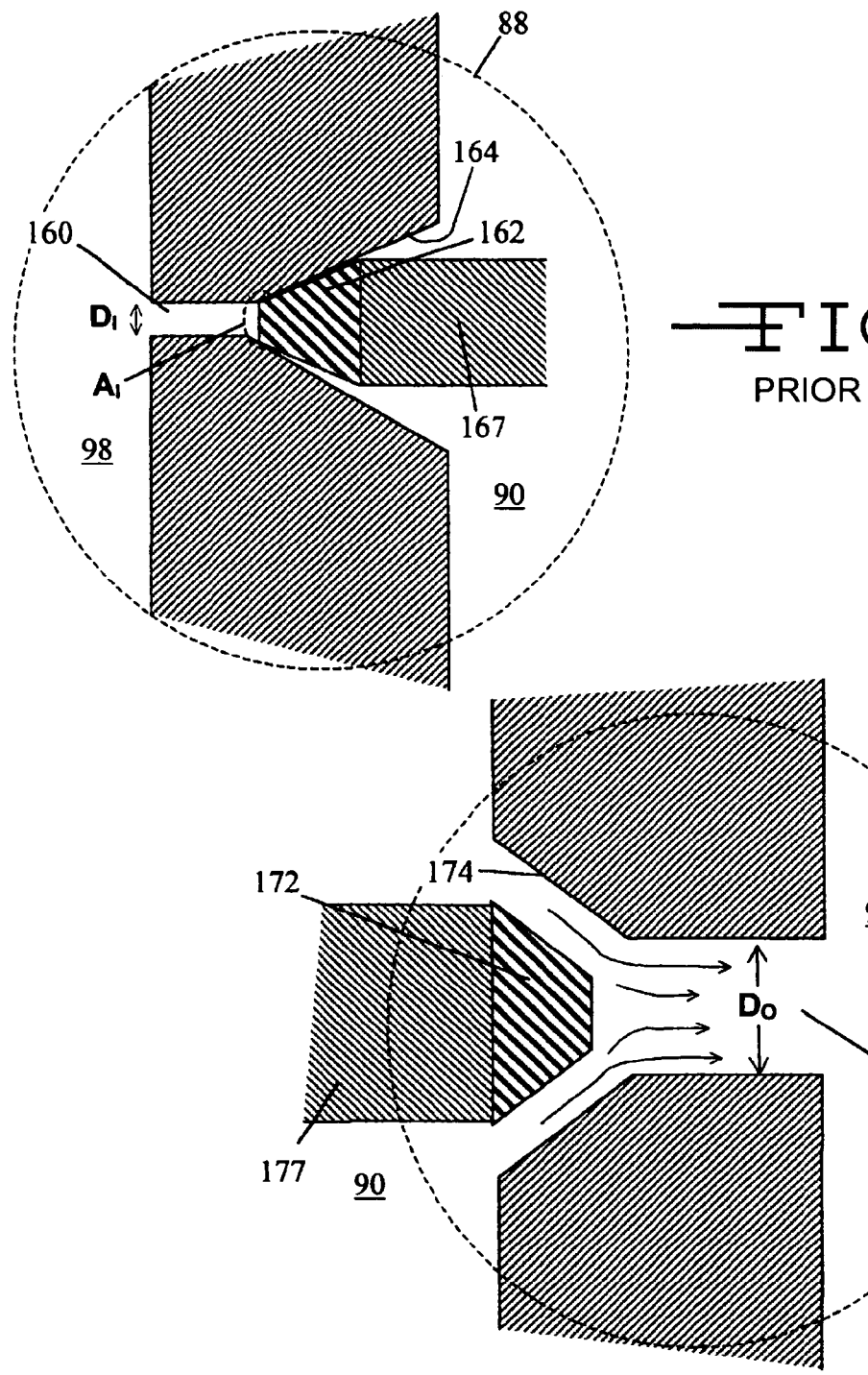
FIG. 4 shows a cross-section of the valve members and valve seats of the reference chamber valve means of the variable control valve of FIGS. 1–3.
Figure 4B:
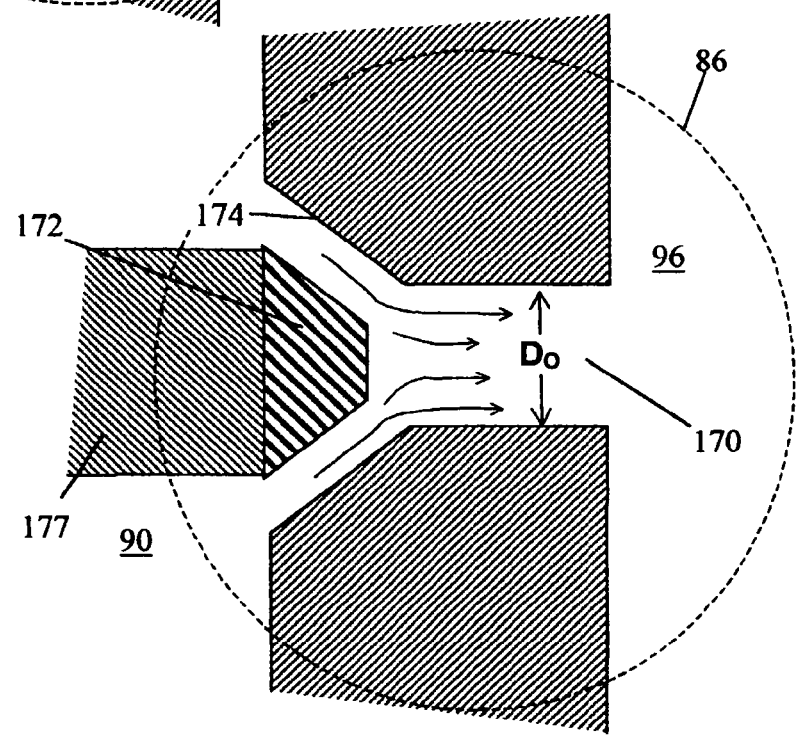
Figure 5:
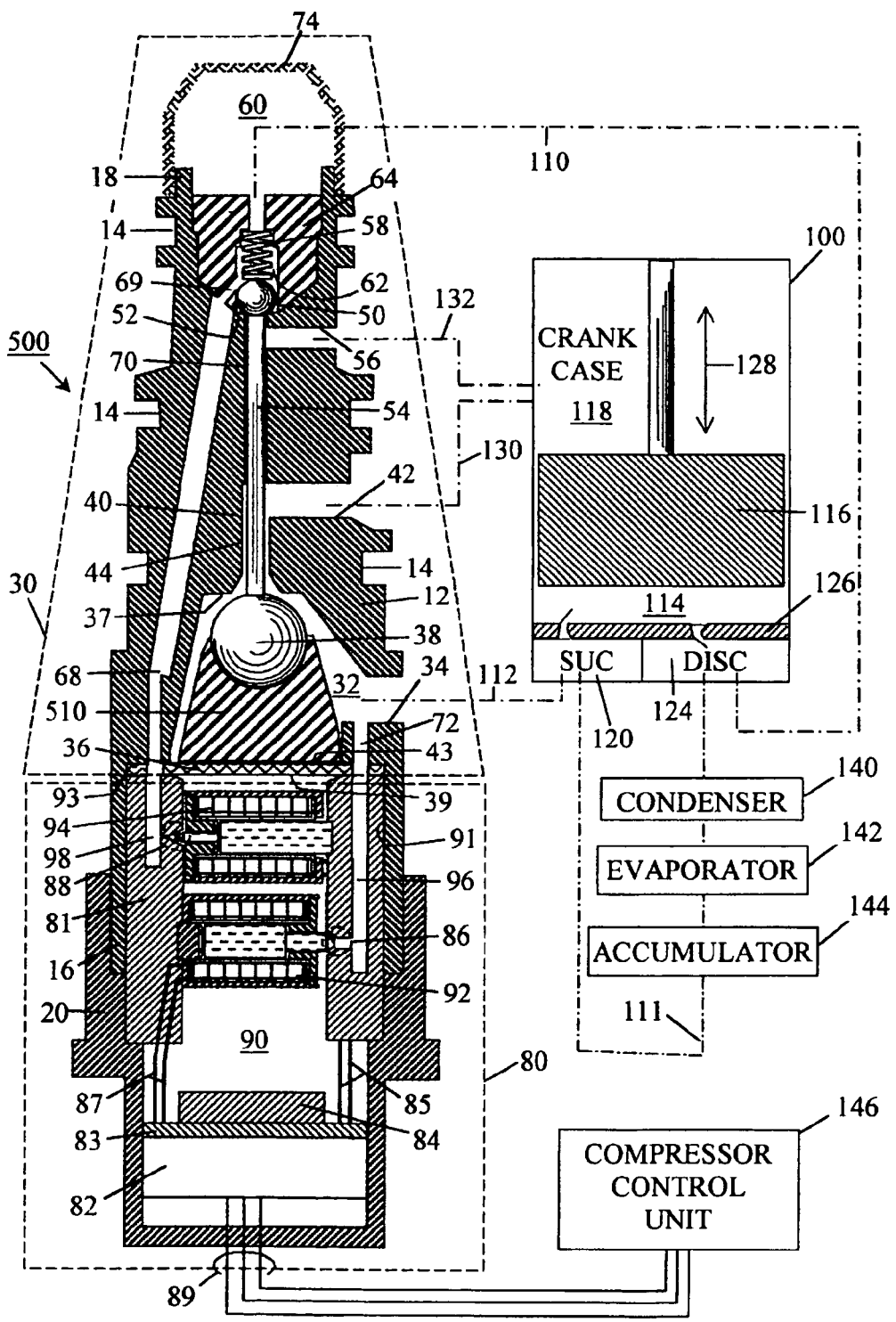
FIG. 5 shows a cross section of a variable set point control valve according to another embodiment of the prior art of U.S. Pat. No. 6,390,782.
Figure 6:
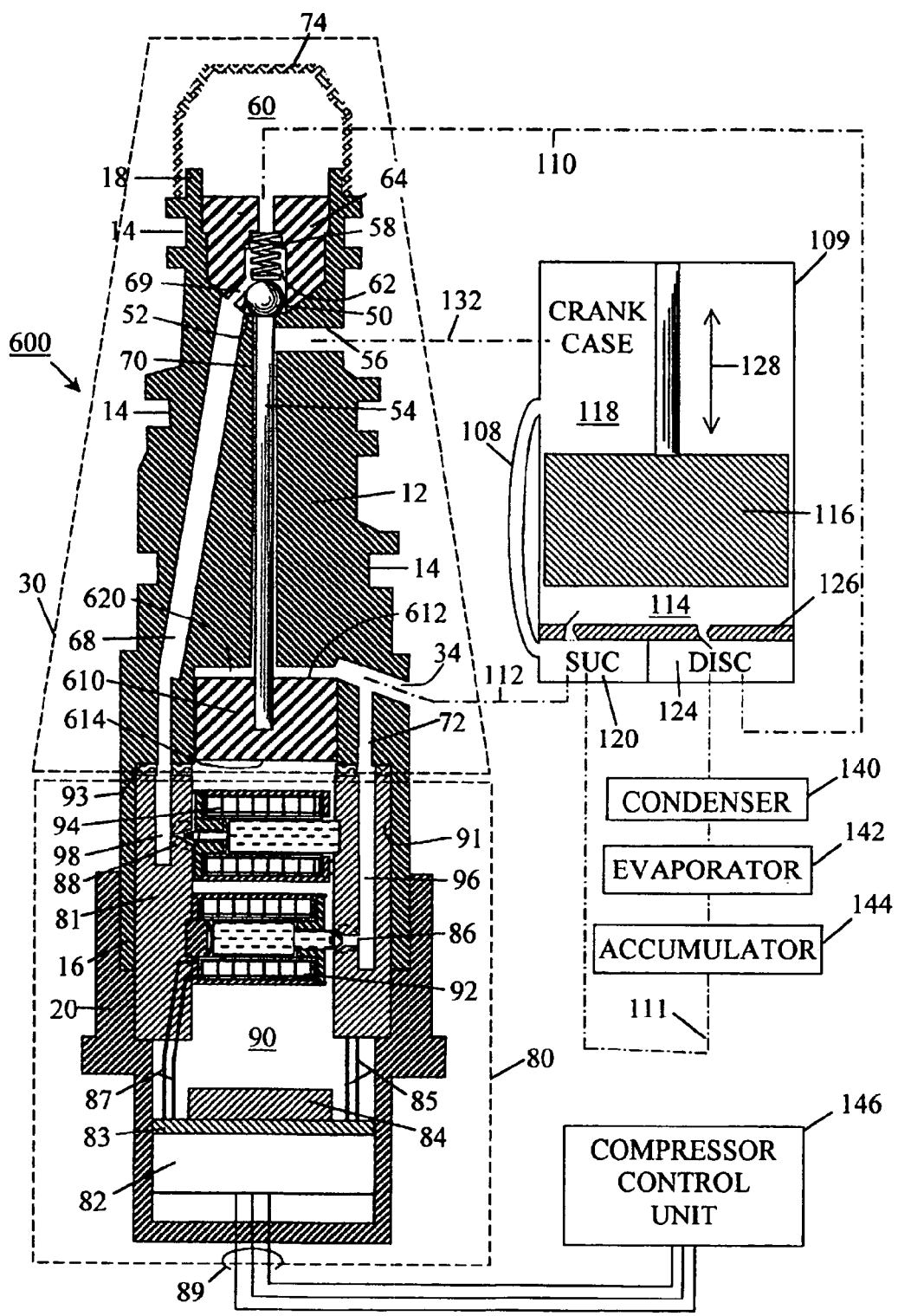
FIG. 6 shows a cross-section of a variable set point control valve according to yet another embodiment of the prior art of U.S. Pat. No. 6,390,782.
Figure 7:
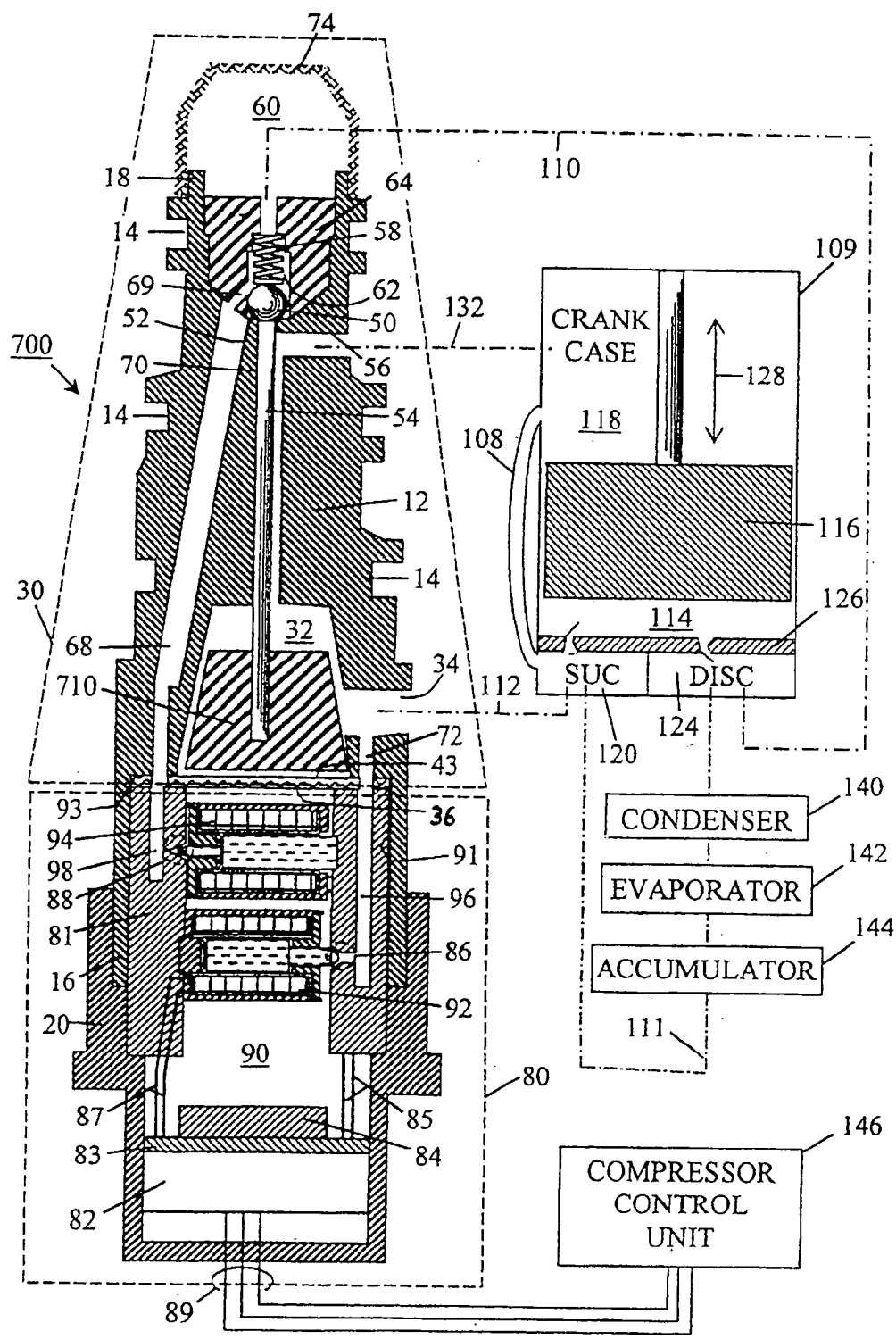
FIG. 7 shows a cross-section of a variable set point control valve according to a further embodiment of the prior art of U.S. Pat. No. 6,390,782.
Figure 8A:
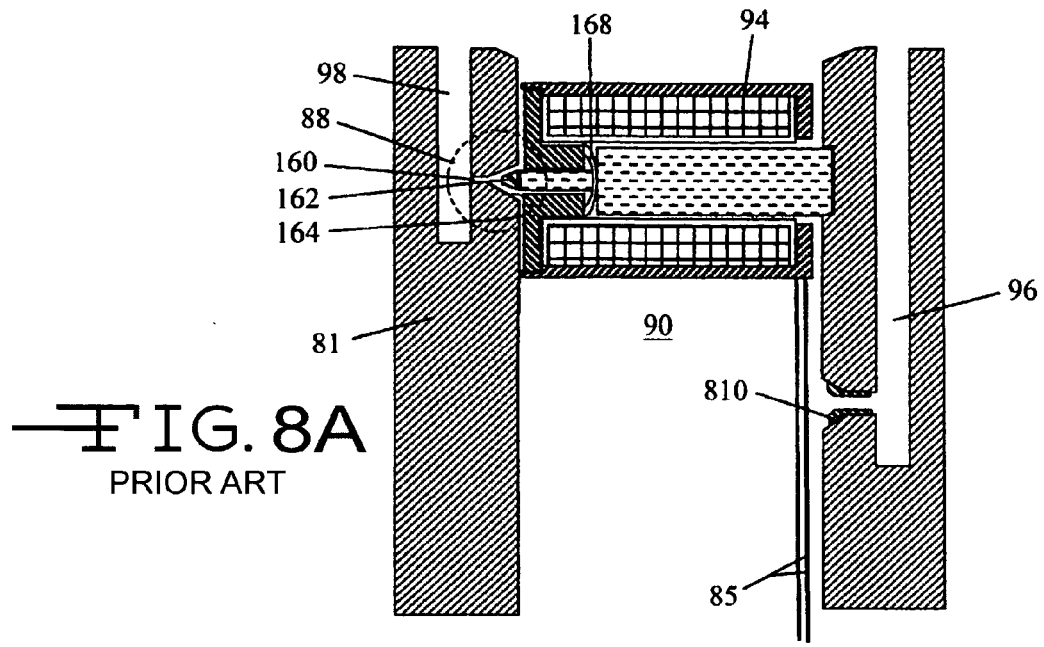
FIG. 8 shows cross-sections of two further embodiments of the reference chamber valve means that can be used with the variable control valves of FIGS. 1, 4, 5, and 6 of the prior art of U.S. Pat. No. 6,390,782.
Figure 8B:
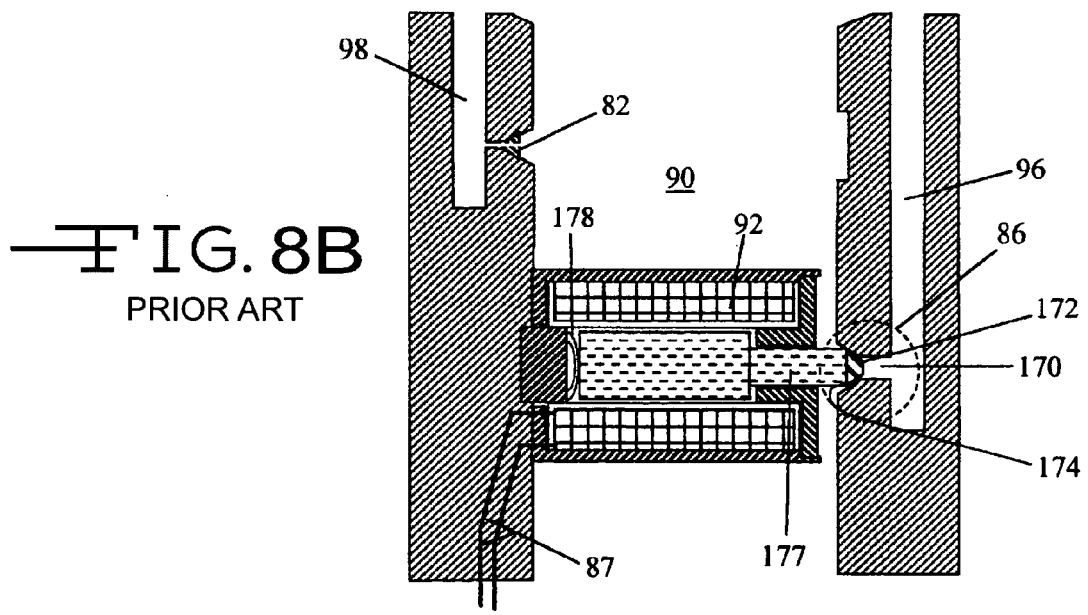
Figure 9:
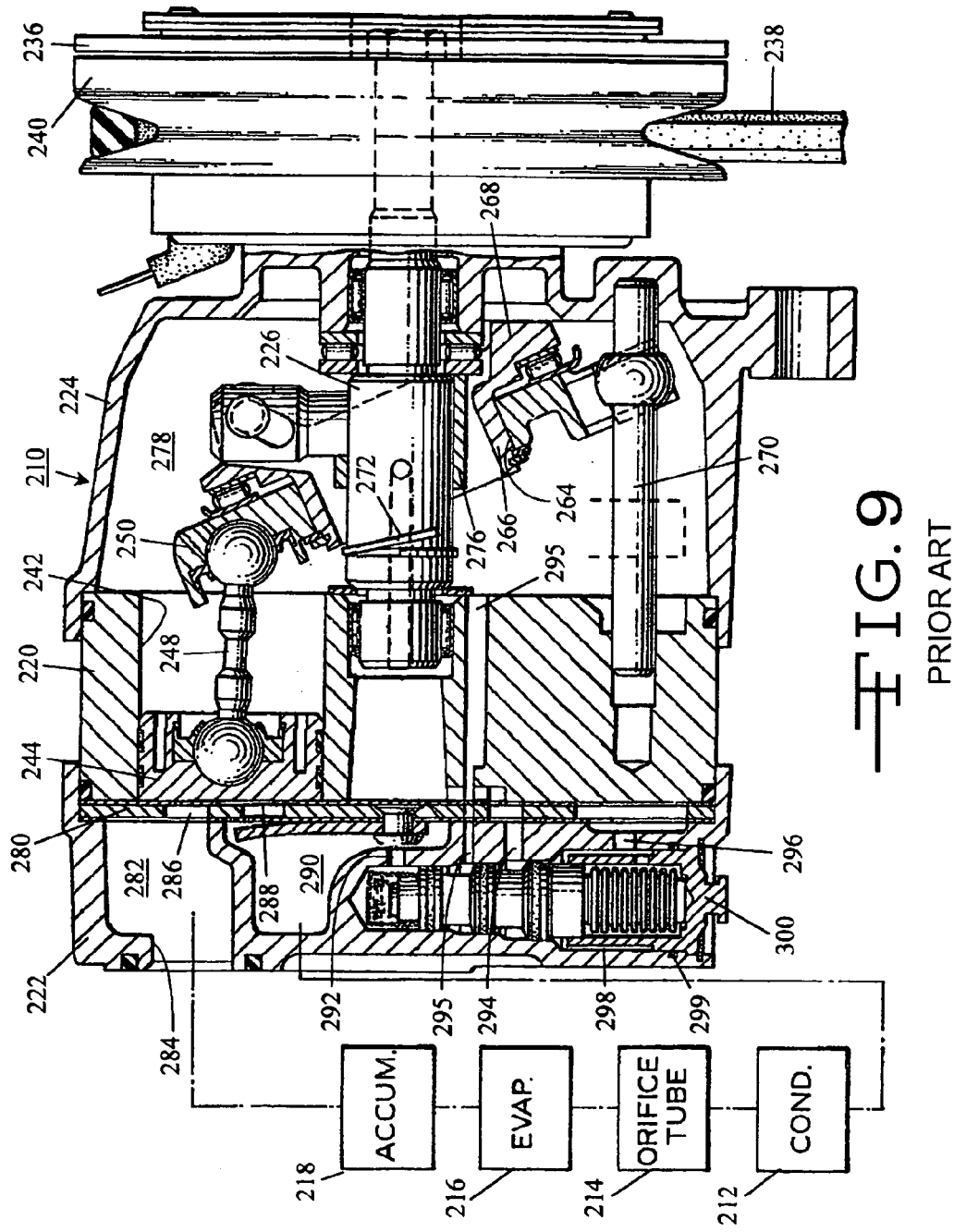
FIG. 9 shows a cross-section of a variable displacement compressor for use in an automobile from the prior art.
Figure 10:
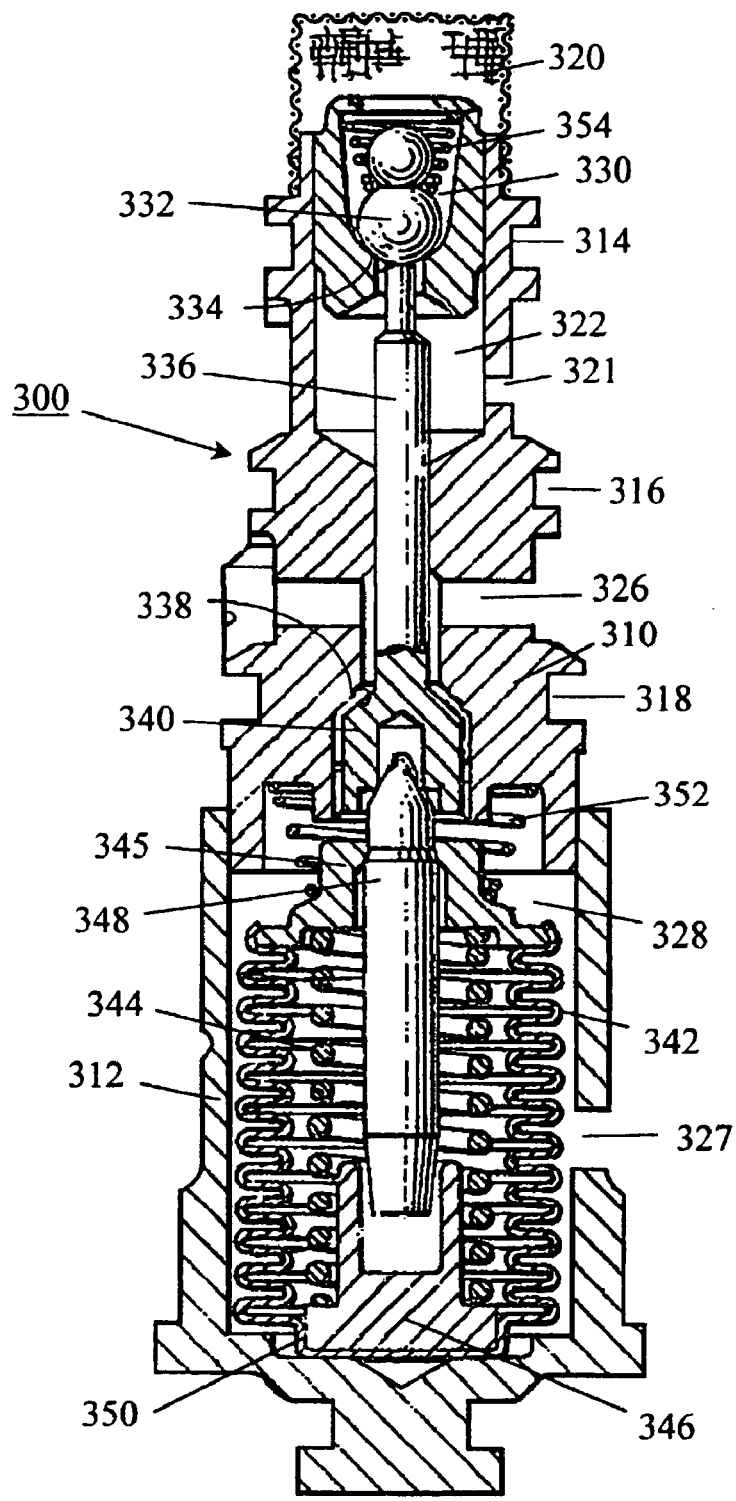
FIG. 10 shows a cross-section of a conventional pneumatic control valve for the variable displacement compressor of FIG. 10 from the prior art.

In the following description of the invention, certain terminology will be used for the purpose of reference only, and are not intended to be limiting. Terms such as "upper", "lower", "above", "below", "rightward", "leftward", "clockwise", and "counterclockwise" refer to directions in the drawings to which reference is made. Terms such as "inward" and "outward" refer to directions toward and away from, respectively, the geometric center of the component described. Terms such as "front", "rear", "side", "leftside", "rightside", "top", "bottom", "horizontal", and "vertical" describe the orientation of portions of the component within a consistent but arbitrary frame of reference which is made clear by reference to the text and the associated drawings describing the component under discussion. Such terminology will include the words specifically mentioned above, derivatives thereof, and words of similar import.

Figure 11:
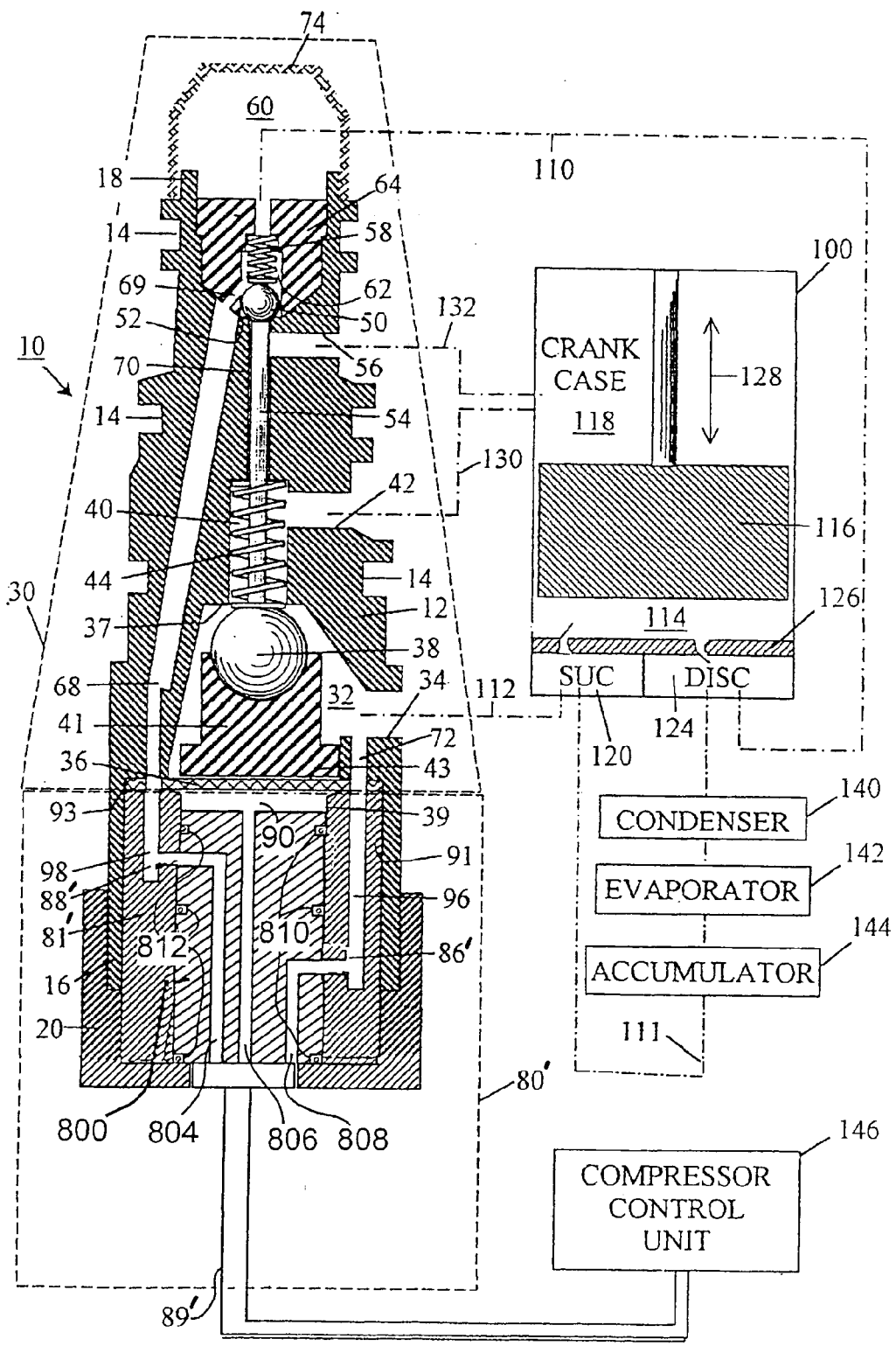
FIG. 11 is an illustration similar to FIG. 1, illustrating an arrangement of a preferred embodiment of the present invention.
Figure 12:
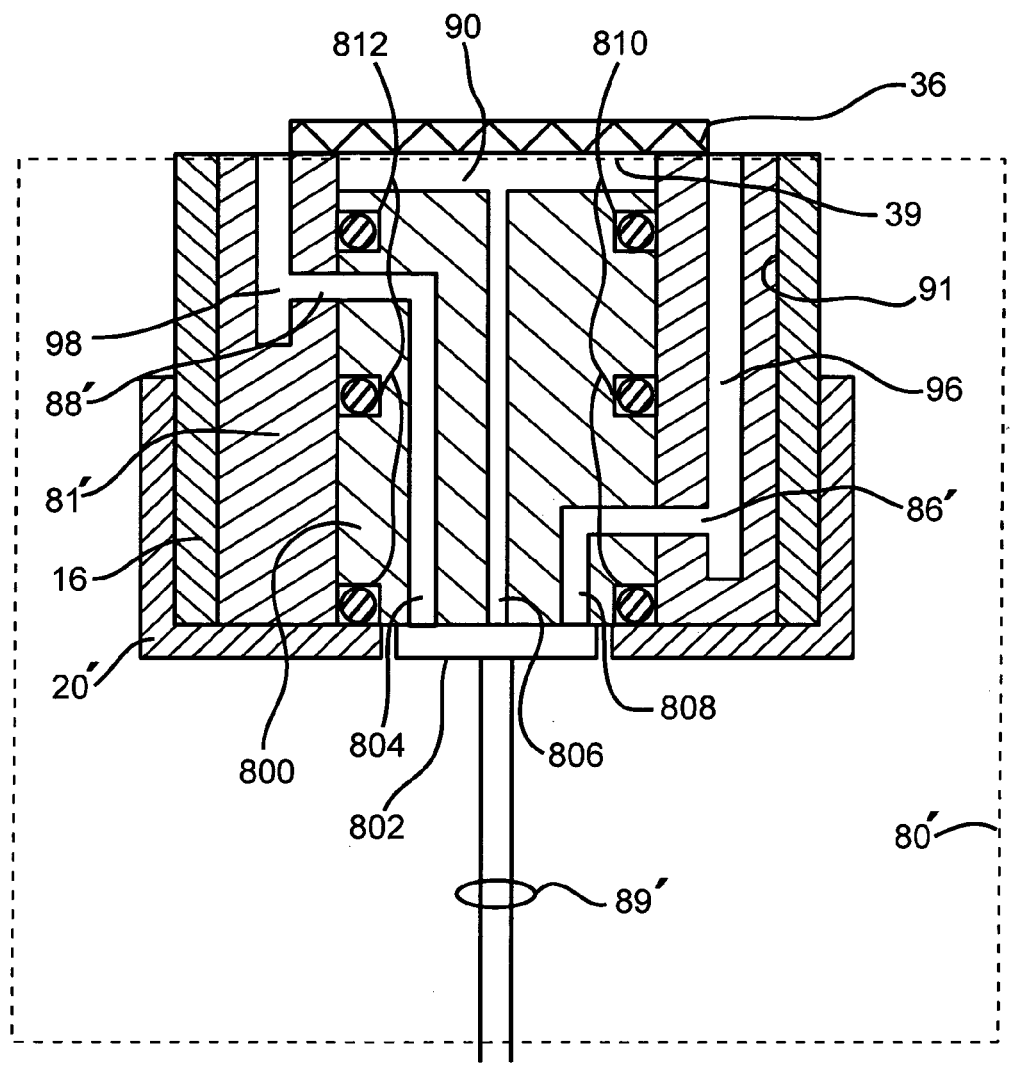
FIG. 12 is an enlarged partial view of the embodiment of FIG. 11.
Figure 14:
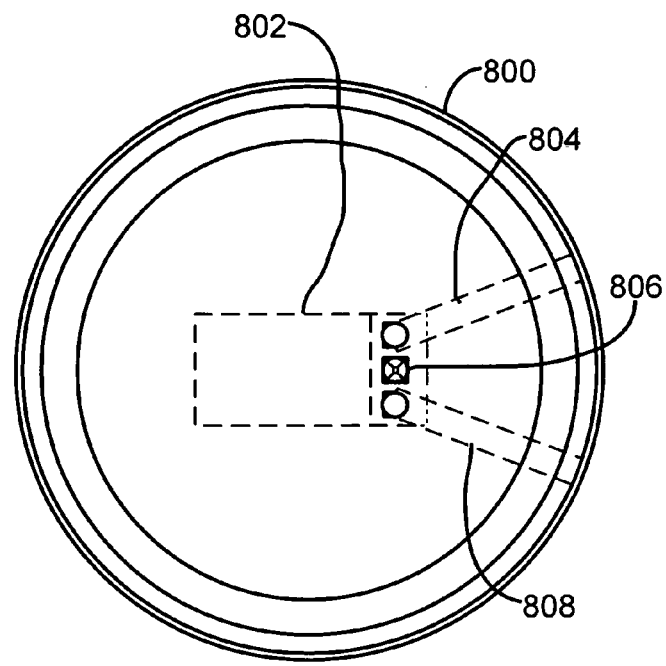
FIG. 14 is a bottom view of the plug of FIGS. 11 and 12 with the microvalve.

An embodiment of the present invention is illustrated in FIGS. 11 and 12. This embodiment is similar to the device shown in FIG. 1 except that the variable control portion 80 has been replaced by a variable control portion 80'. The solenoid actuators 92 and 94 of the variable control portion 80 have been replaced by a plug 800 and a microvalve 802, also shown in FIGS. 14 and 15. Except as further described below, the structure and function of the control valve 10 are otherwise generally the same as the embodiment illustrated in FIG. 1.

A reference valve carrier 81' defines a reference chamber port generally indicated as a reference inlet port 88' in fluid communication with the discharge bleed chamber 98. The reference valve carrier 81' also defines a reference outlet port 86' in fluid communication with the suction bleed chamber 96.

The plug 800 is disposed in the reference valve carrier 81'. The plug 800 is generally cylindrical. The plug 800 includes three o-ring grooves 810 circumferentially formed about the surface of the plug 800. There is an o-ring 812 disposed in each o-ring groove 810. Each o-ring 812 forms a seal between the plug 800 and the reference valve carrier 81'.

The plug 800 includes a discharge fluid passageway 804, a reference fluid passageway 806, and a suction fluid passageway 808.

The microvalve 802 is mounted upon the plug 800 opposite the reference chamber 90. The microvalve 802 is preferably mounted by a plurality of solder point connections. The points of solder connection between the plug 800 and the microvalve 802 preferably includes the areas on the plug 800 around the passageways 804, 806 and 808, and do not include an area under an actuator 867 (shown in FIG. 13) of the microvalve 802. However, it must be understood that the microvalve 802 may be mounted in any suitable manner such as in U.S. Pat. No. 6,581,640 entitled "Laminated Manifold for Microvalve", the disclosures of which are hereby incorporated herein by reference, which describes a terminal block is fixed to manifold for a microvalve by any suitable means, such as a mechanical fastener, such as a rivet or a bolt, by a suitable adhesive, or by soldering.

The discharge fluid passageway 804 and the reference inlet port 88' cooperate to allow fluid communication between the discharge bleed chamber 98 and the microvalve 802. The reference fluid passageway 806 allows fluid communication between the reference chamber 90 and the microvalve 802. The suction fluid passageway 808 and the reference outlet port 86' cooperate to allow fluid communication between the suction bleed chamber 96 and the microvalve 802.

The microvalve 802 is electrically connected to a compressor control unit 146 by wires 89'

Figure 13:
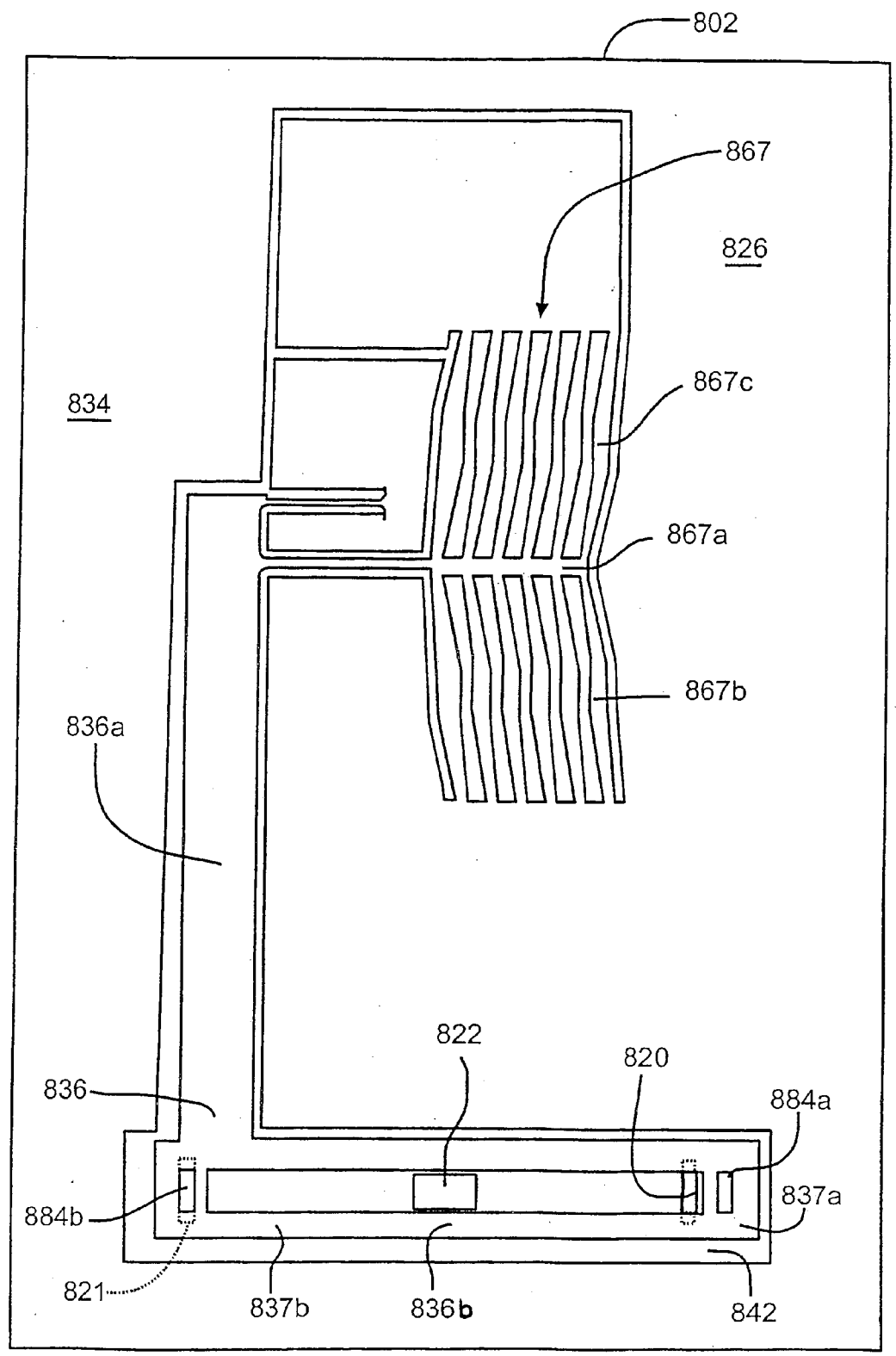
FIG. 13 is a top plan view of an embodiment of a microvalve device according to this invention which is suitable for use in the control valve of FIGS. 11 and 12 and which is partially broken away to show the movable components of the microvalve device.

FIG. 13 illustrates an embodiment of a microvalve 802 according to this invention that is suitable for use as the microvalve 802 in the variable control portion 80' of FIGS. 11 and 12. FIG. 13 is a sectional view of a layer of the microvalve illustrated in FIGS. 11 and 12. The microvalve 802 includes a plate 826 defining a cavity 842. A generally "L-shaped" valve 836 is disposed in the cavity 842 for movement between a first position (as shown) and a second position (not shown). The valve 836 includes an elongated beam 836a attached to a fixed portion 834 of the plate 826. A blocking portion 836b extends from a free end of the beam 836a. Preferably, the blocking portion 836b extends at an angle approximately ninety degrees from a respective side of the beam 836a. Alternatively, the blocking portion 836b may extend from the beam 836a at any suitable angle. Preferably, the blocking portion 836b will be substantially the same plane as the beam 836a. The blocking portion 836b includes a first portion 837a and a second portion 837b. The first portion 837a alternately unblocks and blocks a first micro port 820. The second portion 837b blocks and unblocks a second micro port 821 (shown in dashed lines) when the valve 836 moves between the first and second positions. The blocking portion 836b allows for selective fluid communication of the first micro port 820 and the second micro port 821 with a third micro port 822. The first micro port 820 is in fluid communication with the suction fluid passageway 808. The second micro port 821 is in fluid communication with the discharge fluid passageway 804. The third micro port 822 is in fluid communication with the reference fluid passageway 806. The valve 836 is operable to selectively allow fluid communication between the suction fluid passageway 808 and reference fluid passageway 806 and the discharge fluid passageway 804 and the reference fluid passageway 806. In FIG. 13 the valve 836 is shown allowing fluid communication between the suction fluid passageway 808 and reference fluid passageway 806, which is the preferred normal position. Not shown is the valve 836 allowing fluid communication between the discharge fluid passageway 804 and the reference fluid passageway 806, which is preferably obtained in the actuated position.

Preferably, the blocking portion 836b defines a first micro vent 884a, which extends between upper and lower surfaces of the valve 836. When the valve 836 is in the actuated position the first micro vent 884a is in fluid communication with the first micro port 820 and a first micro trough (not shown). U.S. Pat. No. 6,540,203 entitled "Pilot Operated Microvalve Device", the disclosures of which are hereby incorporated herein by reference, describes a similar vent and trough arrangement suitable for use in a microvalve and explains the purpose of the micro vents. As such, the first micro vent 884a maintains fluid communication between the first micro port 820 and the first micro trough (not shown) through the valve 836 when in the activated position. The blocking portion 836b also defines a second micro vent 884b, which extends between the upper and lower surfaces of the valve 836. Similar to the arrangement between the first micro vent 884a, the first micro port 820, and the first micro trough (not shown), the second micro vent 884b is in fluid communication with the second micro port (not shown) and a second micro trough (not shown) when the valve 836 is in the normal position.

The plate 826 further includes the valve actuator indicated generally at 867. The actuator positions the beam 836a. The actuator 867 includes an elongated spine 867a attached to the beam 836a. The actuator 867 further includes multiple pairs of opposing first ribs 867b and second ribs 867c. Each first rib 867b has a first end attached to a first side of the spine 867a and a second end attached to the fixed portion 834. Similar to the first ribs 867b, each second rib 867c has a first end attached to a second side of the spine 867a and a second rib end attached to the fixed portion 834. The ribs 867b, 867c are designed to thermally expand (elongate) and contract. Electrical contacts 867d (shown in FIG. 15) are adapted for connection to a source of electrical power to supply electrical current flowing through the ribs 867b and 867c to thermally expand the ribs 867b and 867c. The actuator 867 is adapted to be controlled by an electronic control unit such as the compressor control unit 146 illustrated in FIG. 11.

Figure 16:
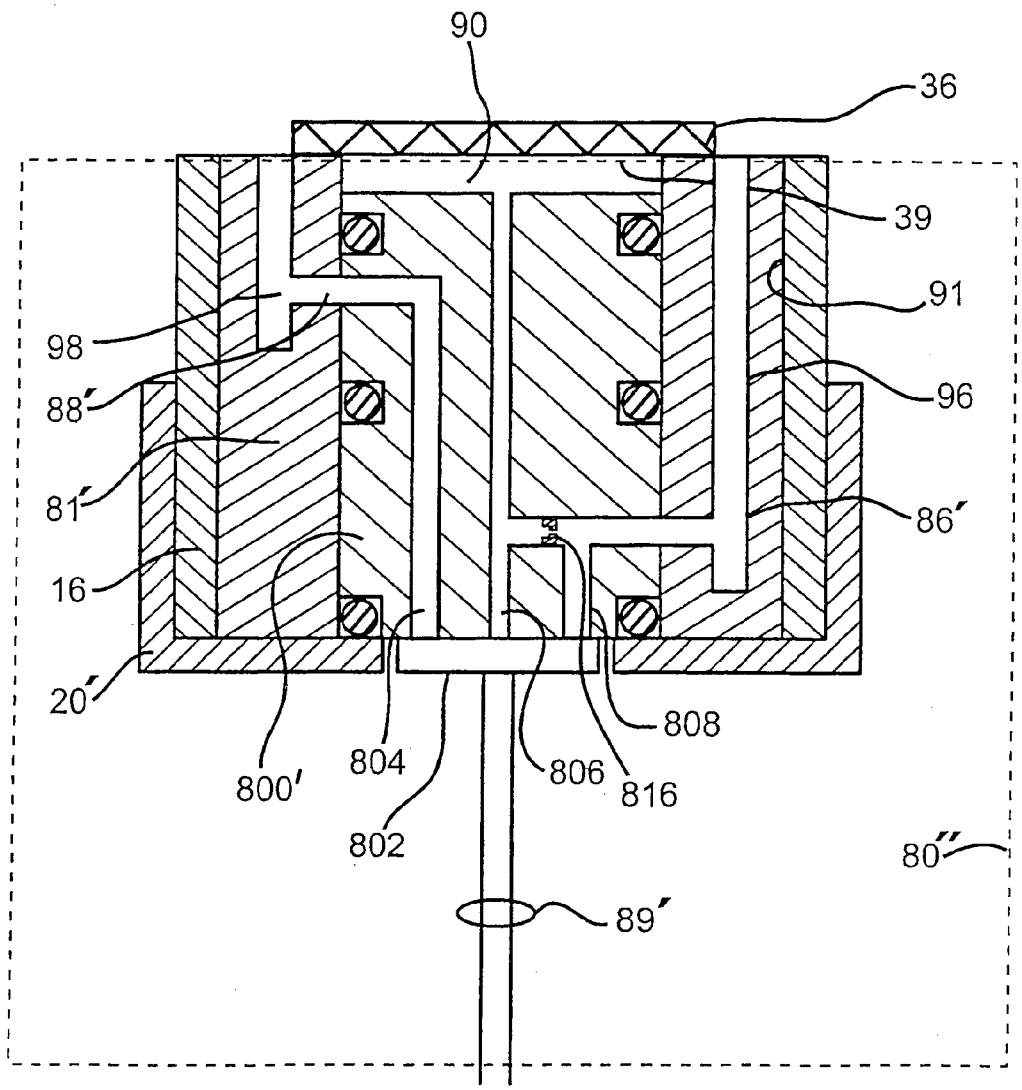
FIG. 16 is a view similar to FIG. 12, except showing an alternate embodiment in which an orificed constant bleed path is formed in the plug between the reference fluid passageway and the suction fluid passageway.

Referring now to FIG. 16, a plug 800' is shown. The plug includes an orificed constant bleed path 816 formed in the plug 800' between the reference fluid passageway 806 and the suction fluid passageway 808. The orificed constant bleed path 816 allows constant fluid communication between the reference fluid passageway 806 and the suction fluid passageway 808. The fluid communication is restricted by the orificed constant bleed path 816 such that fluid pressure may still build up in the reference chamber 90 when the microvalve 802 allows fluid communication between the discharge bleed chamber 98 through the reference inlet port 88' and the reference chamber 90 through the reference fluid passageway 806, but with a high degree of control.

Figure 17:
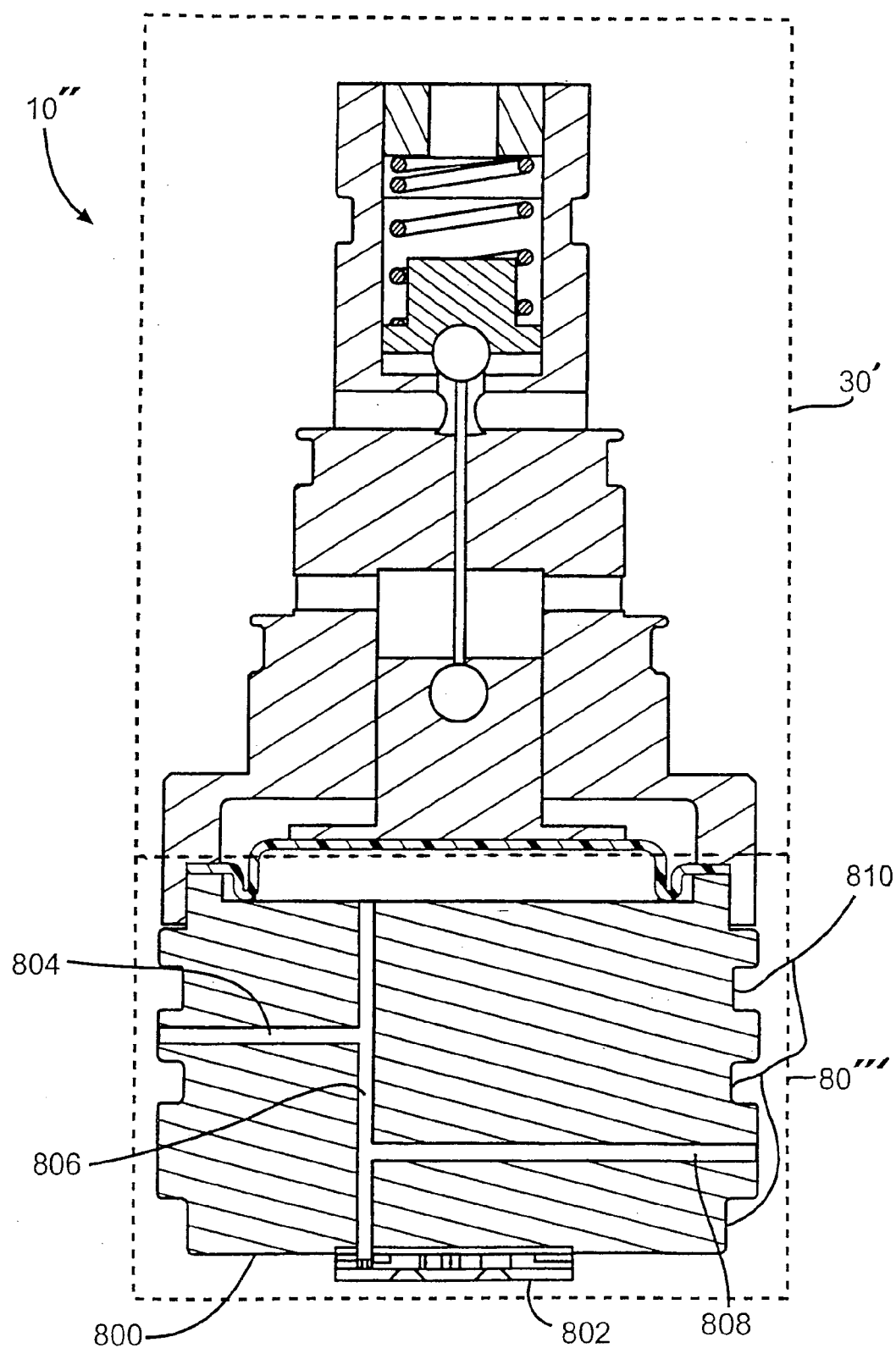
FIG. 17 shows a side cross-sectional plan view of a microvalve operated control valve for a variable displacement compressor in accordance with another alternative embodiment of the present invention.

Referring now to FIG. 17, a microvalve operated control valve 10" for a variable displacement compressor in accordance with another alternative embodiment of the present invention includes a compressor displacement control portion 30' and a variable set point control portion 80'.

Referring now to FIG. 18, a micro spool valve 902 is shown that is suitable for use in place of the control valve 10 as shown in FIG. 1. FIG. 18 is a sectional view of a layer of the micro spool valve 902. The micro spool valve 902 generally includes a first microvalve forming a pilot portion (4-way pilot microvalve) 903 and a second microvalve forming a spool portion (2-way pilot operated microvalve) 905, as shown in dashed lines.

The micro spool valve 902 includes an intermediate plate layer 926 forming an intermediate plate layer of a multi-layer valve body of the micro spool valve 902. The layers are fabricated and joined together in any suitable fashion, such as that of U.S. Pat. Nos. 6,540,203 and 6,494,804 and U.S. Patent Application Pub. No. 2002/017489141, discussed above, and other similar multi-layer microvalves. The pilot portion 903 includes a cavity 942 defined by the intermediate plate layer 926. A generally "I-shaped" pilot valve (pilot microvalve) 936 is disposed in the cavity 942. The pilot valve 936 includes an elongated beam 936a attached to a fixed portion of the intermediate plate layer 926 by a flexible hinge 934 and an actuator, indicated generally at 967 and described more fully below, for moving the "I-shaped" pilot valve 936 between a first, unactuated or de-energized position (as shown) and a second, actuated or energized position (not shown). Blocking portions 936b and 936c extends from opposite free ends of the beam 936a. Preferably, the blocking portions 936b and 936c extend at an angle approximately ninety degrees from a respective side of the beam 936a, though, the blocking portions 936b and 936c may extend from the beam 936a at any suitable angle. Preferably, the blocking portions 936b and 936c will be disposed in substantially the same plane as the beam 936a and more preferably the blocking portions 936b and 936c are formed integrally with the beam 936a from the plate of material forming the intermediate plate layer 926. Indeed, all of the moving and stationary portions of the micro spool valve 902, discussed with respect to FIG. 18, are formed from the plate of material forming the intermediate plate layer 926, except as specifically indicated below.

Figure 18A:
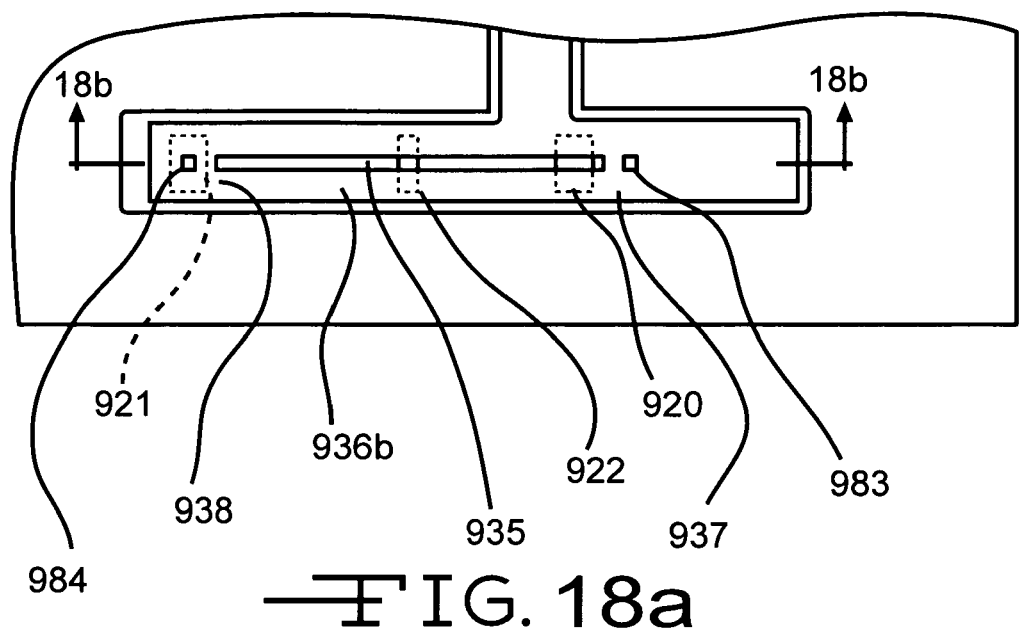
FIG. 18a is a view of a portion of the layer of the micro spool valve of FIG. 18.
Figure 18B:
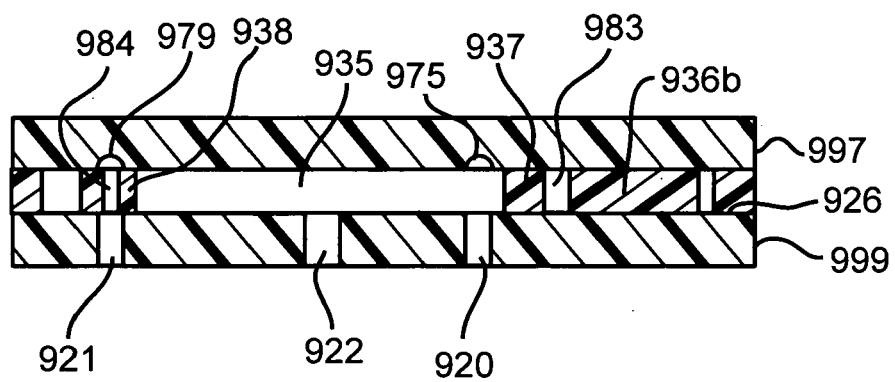
FIG. 18b is a side view of the portion of FIG. 18a taken along lines 18b.

As best seen in FIGS. 18a and 18b, the blocking portion 936b includes a first portion 937 and a second portion 938. The first portion 937 unblocks and blocks a first micro port 920 formed through a lower plate layer 999 of the micro spool valve 902 adjacent to the intermediate plate layer 926 when the pilot valve 936 moves between the first and second positions, respectively. The second portion 938 blocks and unblocks a second micro port 921 (shown in dashed lines) formed through the adjacent lower plate layer 999 when the pilot valve 936 moves between the first and second positions, respectively. The blocking portion 936b has an internal passage 935 formed therein that allows for selective fluid communication between the unblocked one of the first micro port 920 and the second micro port 921 with a third micro port 922.

In the illustrated embodiment, the first portion 937 and the second portion 938 are proportioned and spaced apart such that, as the pilot valve 936 transitions from the unactuated state to the actuated state, or from the actuated state to the unactuated state, the first and second micro ports 920 and 921 are simultaneously partially unblocked and in communication with the third micro port 922 via the passage 935. It is contemplated, however, that the first portion 937 and the second portion 938 may, in an alternate embodiment, be proportioned and spaced apart such that, as the pilot valve 936 transitions from the unactuated state to the actuated state, or from the actuated state to the unactuated state, the first micro ports 920 and 921 are simultaneously blocked from communication with the third micro port 922 via the passage 935. In such an embodiment, the third micro port 922 would be in communication with the first micro port 920 when the pilot valve 936 is in the unactuated state, the third micro port 922 would be in communication with neither the first micro port 920 or the second micro port 921 at an intermediate actuated point, and the third micro port is in fluid communication only with the second micro port 921 when the pilot valve 936 is in the fully actuated position.

Preferably, the blocking portion 936b defines a first micro vent 983, which extends between upper and lower surfaces of the microvalve 936 to provide pressure balancing in a direction perpendicular to the intermediate plate layer 926. When the pilot valve 936 is in the actuated position, the first micro vent 983 is in fluid communication with the first micro port 920 and a first micro trough 975 formed in a layer 997 of the micro spool valve 902 adjacent to the intermediate plate layer 926. U.S. Pat. No. 6,540,203 entitled "Pilot Operated Microvalve Device", the disclosures of which are hereby incorporated herein by reference, describes a similar vent and trough arrangement suitable for use in a microvalve and explains the purpose of such micro vents. As such, the first micro vent 983 maintains fluid communication between the first micro port 920 and the first micro trough 975 through the pilot valve 936 when in the activated position. The blocking portion 936b also defines a second micro vent 984, which extends between the upper and lower surfaces of the pilot valve 936. Similar to the arrangement between the first micro vent 983, the first micro port 920 provides pressure balancing. The first micro trough 975 and the second micro vent 984 are in fluid communication with the second micro port 921 (shown in dashed lines) and a second micro trough 979, when the microvalve 936 is in the normal, unactuated position.

Figure 18C:
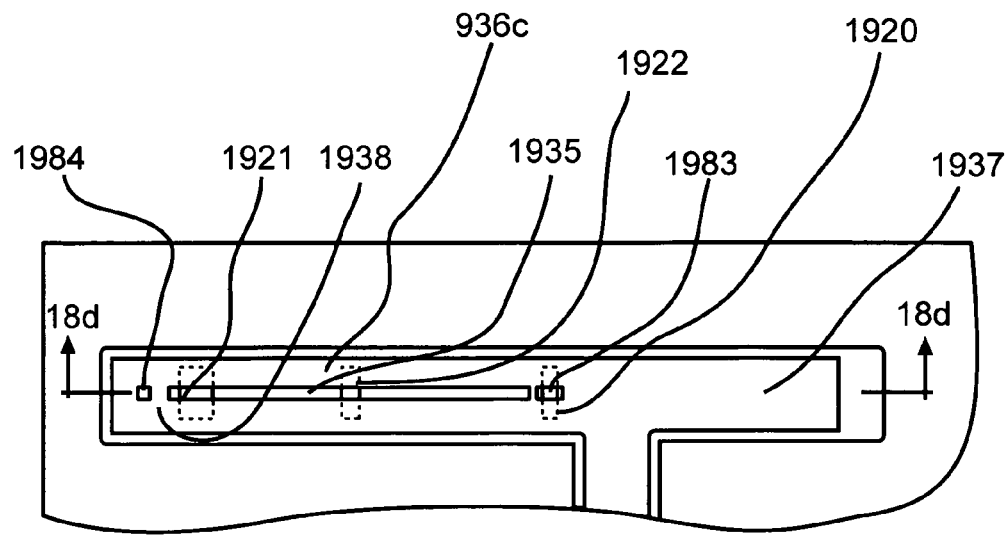
FIG. 18c is a view of a portion of the layer of the micro spool valve of FIG. 18.
Figure 18D:
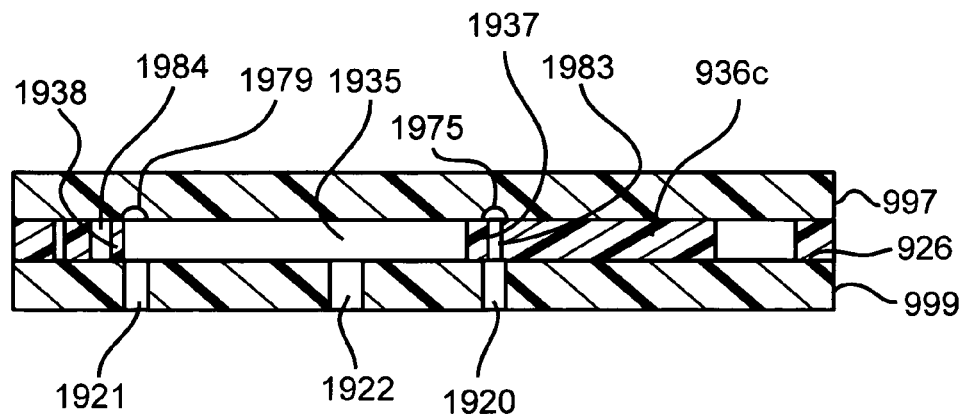
FIG. 18d is a side view of the portion of FIG. 18c taken along lines 18d.

Similarly, as best seen in FIGS. 18c and 18d, the blocking portion 936c includes a first portion 1937 and a second portion 1938. The first portion 1937 unblocks and blocks a first micro port 1920 (shown in dashed lines) when the pilot valve 936 moves between the first and second positions, respectively. The first micro port 1920 is formed through the lower plate layer 999 of the micro spool valve 902 adjacent to the intermediate plate layer 926. The second portion 1938 blocks and unblocks a second micro port 1921 when the pilot valve 936 moves between the first and second positions, respectively. The second micro port 1921 is formed through the adjacent lower plate layer 999. The blocking portion 936c has an internal passage 1935 formed therein that allows for selective fluid communication of the first micro port 1920 and the second micro port 1921 with a third micro port 1922. Similar to the first portion 937 and the second portion 938, the first portion 1937 and the second portion 1938 of the blocking portion 936c may suitably be proportioned and spaced apart to either permit simultaneous fluid communication between all three micro ports 1920, 1921, and 1922 in an intermediately actuated position, or to block the third micro port 1922 from communication with either of the first micro port 1920 and the second micro port 1921 when the pilot valve 936 is moved to an intermediate actuated position.

The blocking portion 936c, similar to the blocking portion 936b, defines a first micro vent 1983, which extends between upper and lower surfaces of the valve 936. When the pilot valve 936 is in the normal, unactuated position, the first micro vent 1983 is in fluid communication with the first micro port 1920 and a first micro trough 1975 formed in the layer 997. The first micro vent 1983 maintains fluid communication between the first micro port 1920 and the first micro trough 1975 through the pilot valve 936 when in the normal, unactuated position, to provide pressure balancing on opposite surfaces of the valve 936. The blocking portion 936c also defines a second micro vent 1984, which extends between the upper and lower surfaces of the pilot valve 936, for the same purpose, i.e., pressure balancing. Similar to the arrangement between the first micro vent 1983, the first micro port 1920, and the first micro trough 1975, the second micro vent 1984, the second micro port 1921, and a second micro trough 1979 are in fluid communication when the pilot valve 936 is in the actuated position. When the pilot valve 936 is in the normal, unactuated position, the first micro vent 1983 is in fluid communication with the first micro port 1920 and a first micro trough 1975 and when the pilot valve 936 is in the actuated position the second micro vent 1984 is in fluid communication with the second micro port 1921 and the second micro trough 1979. The first micro vent 1983 maintains fluid communication between the first micro port 1920 and the first micro trough 1975 through the pilot valve 936, and the second micro vent 1984 maintains fluid communication between the second micro port 1921 and the second micro trough 1979 through the pilot valve 936 when in the normal, unactuated position and similarly the second micro vent 1984 maintains fluid communication between the second micro port 1921 and the second micro trough 1979 through the pilot valve 936, and the first micro vent 1983 maintains fluid communication between the first micro port 1920 and the first micro trough 1975 through the pilot valve 936, when in the activated position. The first micro vent 1983 and the second micro vent 1984 provide a pressure balancing function, similar to the micro vents 983 and 984.

It will be appreciated from the above description that the pilot valve 936 may be characterized as including two three-way microvalves joined by the beam 936a to be actuated in tandem by the actuator 967. The blocking portion 936b operates as the movable element of a first three-way valve by controlling fluid communication among the first micro port 920, the second micro port 921, and the third micro port 922. The blocking portion 936c operates as the movable element of a second three-way valve by controlling fluid communication among the first micro port 1920, the second micro port 1921, and the third micro port 1922. In conjunction, these two three-way microvalves function as a four-way microvalve, in that the pilot valve 936 has a fluid inlet connection (composed of the two micro ports 920 and 1920, which are connected to discharge pressure), an outlet connection (composed of the two micro ports 921 and 1921, which are connected to suction pressure), and first and second load connections (composed of the two micro ports 922 and 1922, which are connected to opposite ends of the spool valve 905).

Figure 15:
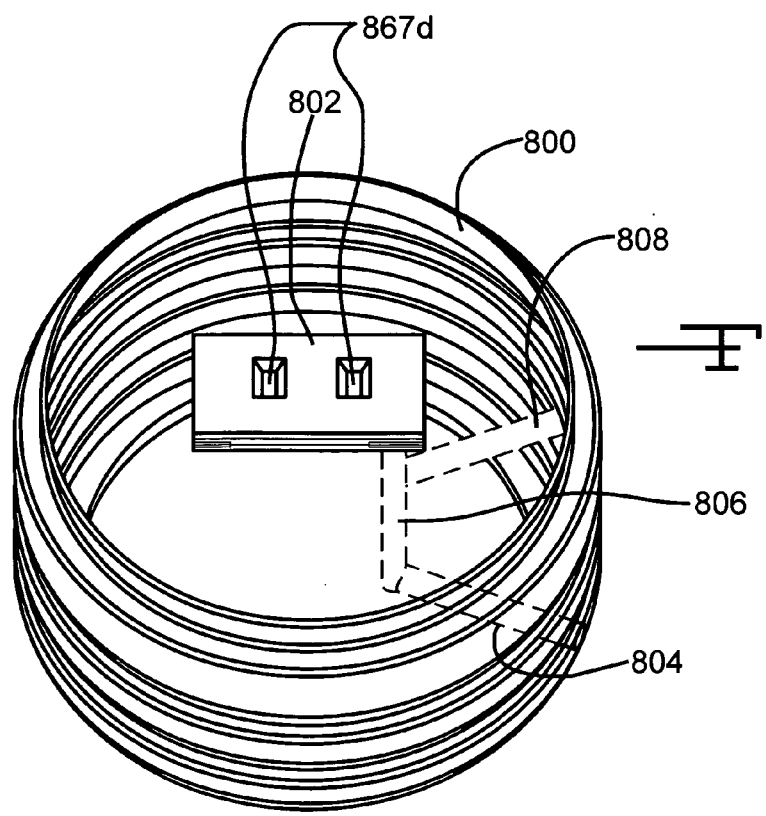
FIG. 15 is a perspective view of the plug of FIGS. 11 and 12 with the microvalve.

Referring again to FIG. 18, the intermediate plate layer 926 further includes the valve actuator indicated generally at 967. The actuator positions the beam 936a. The actuator 967 includes an elongated spine 967a attached to the beam 936a. The actuator 967 further includes multiple pairs of opposing first ribs 967b and second ribs 967c. Each first rib 967b has a first end attached to a first side of the spine 967a and a second end attached to the fixed portion of the intermediate plate layer 926. Similar to the first ribs 967b, each second rib 967c has a first end attached to a second side of the spine 967a and a second end attached to the fixed portion of the intermediate plate layer 926. Electrical contacts, such as the electrical contacts 867d, as shown in FIG. 15, are adapted for connection to a source of electrical power to supply electrical current flowing through the ribs 967b and 967c to heat the ribs 967b and 967c, and thus cause the ribs to elongate. When electrical current is decreased, ohmic heating is decreased and the ribs shorted. The actuator 967 is adapted to be controlled by an electronic control unit such as the compressor control unit 146 as illustrated in FIG. 11.

The spool portion 905 includes a cavity 985 defined by the intermediate plate layer 926. A pilot operated microvalve in the form of a spool valve 986 is disposed in the cavity 985 for movement between a first position (as shown) and a second position (not shown). The spool valve 986 includes a longitudinally elongated central recessed portion 986a, which slidably engages an attached elongated guide beam fixed portion 987 of the intermediate plate layer 926. Preferably, the fixed portion 987 is bonded to both of the two layers (the lower layer 926 and an upper layer (not shown)) of the multilayer valve body adjacent to the intermediate plate layer 926, thereby functioning as pressure reinforcing members similar to the pressure reinforcing "peninsulas" described in WO 01/712261, the disclosures of which are hereby incorporated by reference. The spool valve 986 includes blocking portions 986b and 986c, which are at opposite ends of the spool valve 986. Preferably, the blocking portions 986b and 986c are oriented at an angle approximately ninety degrees from a respective side of the recessed portion 986a. Alternatively, the blocking portions 986b and 986c may be oriented from the recessed portion 986a at any suitable angle. Preferably, the blocking portions 986b and 986c will be substantially the same plane as the guide beam fixed portion 987. The blocking portions 986b and 986c alternately unblock and block respective micro ports 988b and 988c, in an inversely proportional relationship, when the spool valve 986 moves between the first and second positions. Preferably, the micro ports 988b and 988c are separated by raised sealing areas 988d. The blocking portions 986b and 986c allow for selective fluid communication to the micro ports 988b and 988c. In an alternative embodiment, the blocking portions 986b and 986c further allow for selective fluid communication of the micro ports 988b and 988c with a third micro port (not shown) in the adjacent layer 997.

The micro port 988b is in fluid communication with the discharge pressure path 110, as shown in FIG. 1. The micro port 988c is in fluid communication with the first crankcase pressure path 130, and preferably, the second crankcase pressure path 132 is connected to the suction pressure path 112 by a fixed orifice, not shown. The valve 902 is operable to selectively allow fluid communication between the discharge pressure path 110 and the first crankcase pressure path 130. In FIG. 1, the control valve 10 is shown allowing fluid communication between the suction pressure path 112 and the first crankcase pressure path 130, which is the preferred normal, unactuated position. In the actuated position (not shown) the control valve 10 prevents fluid communication between the discharge pressure path 110 and the first crankcase pressure path 130.

Referring again to FIG. 18, preferably, the blocking portion 986b defines micro vents 989, which cooperate with micro troughs (not shown) in the adjacent layer 997 and the micro port 988b similar to the arrangement between the first micro vent 983, the first micro port 920, and the first micro trough 975, as previously discussed.

The intermediate plate layer 926 further includes spool valve springs, indicated generally at 990. The springs 990 bias the spool valve 986 relative to the beam 987.

The spool portion 905 preferably includes a dashpot 991 including a longitudinally extending portion of the spool valve 986 and a recess formed in the wall of the cavity 985, opposite the springs 990. The spool portion 905 preferably includes a feedback port 992 opposite the springs 990. A micro port 998 (as shown in dashed lines) is preferably disposed in the lower plate layer 999 adjacent the dashpot 991 and beneath the spool valve 986. When the spool valve 986 is at an intermediate region (preferably between 5% and 60% of total travel), the feedback port 992 provides fluid communication between the micro port 998 and the region 995 of the cavity 985 between the spool valve 986 and the end wall of the cavity 985. The adjacent plate layers under and/or over the longitudinally extension of the spool valve 986 are recessed slightly to allow communication under and/or over the longitudinal extension of the spool valve 986 of the dashpot 991. Note that the adjacent plate layers are not recessed within the area adjacent the dashpot recess 991, and so the longitudinal extension of the spool valve 986 will seal the port 998 when the feedback port 992 is not in fluid communication therewith. For example, when the feedback port 992 is open, the micro port 998 is connected to the suction pressure path 112 and the feedback port 992 and the micro port 998 are in fluid communication causing the pressure to decrease on the end face of the spool valve 986 exposed to pressure in the cavity 985 at 995. In such a case, when the feedback port 992 closes, the pressure will increase on the portion of the spool valve 986 at 995. The spool portion 905 will therefore respond to the balance of pressure induced forces acting thereon, and may be more finely controlled. The spool portion 905 may be moved between completely full open and completely full closed, or held a position in between these two positions. This is suitable for maintaining the pressure in the crankcase 118, as the spool portion 905 will connect a source of high pressure from discharge 124 to the crankcase 118 as needed to offset the constant bleed to suction 120 referred to above that is built into the compressor housing. It must be understood, however, that the spool portion 905 need not include the dashpot 991 or the feedback port 992. In such a case, the spool portion 905 will tend to move completely between full open and full closed and just open intermittently as needed to increase crankcase pressure.

The spool portion 905 further includes a micro port 993 and a micro port 994. The micro port 993 is in fluid communication with the micro port 922 and the micro port 994 is in fluid communication with the micro port 1922. The micro ports 920 and 1920 are in fluid communication with the suction pressure path 112 (shown in FIG. 1) and thus can act as dumps (areas of low fluid pressure) for the pilot portion 903. The micro ports 921 and 1921 are in fluid communication with the discharge pressure path 110 and thus can act as supplies (sources of high pressure fluid) for the pilot portion 903.

When the micro spool valve 902 is in a de-energized state, the blocking portion 936*b* tends to maintain the micro port 920 in a normally open position and the micro port 921 in a normally closed position, and discharge pressure acts on a portion of the spool valve 986, as generally indicated at 995. When the micro spool valve 902 is in a de-energized state, the blocking portion 936*c* tends to maintain the micro port 1920 in a normally closed position and the micro port 1921 in a normally open position, and suction pressure acts on a portion of the spool valve 986, as generally indicated at 996. When the micro spool valve 902 is in a de-energized state, the springs 990 tend to maintain the spool valve 986, such that micro ports 988*b* and 988*c* are in normally open positions. The pressure profiles in this state are the opposite of those in the energized state, discussed in the following paragraph.

When the actuator 967 is energized, moving the pilot valve 936 to an energized position thereof, the blocking portion 936*b* tends to maintain the micro port 920 in a closed position and the micro port 921 in an open position. The micro port 920 is connected to the discharge pressure and the micro port 921 is connected to suction pressure; the blocking portion in an energized position will thus allow suction pressure to be applied to the spool valve 986 through the micro port 922 via the connection to the micro port 993, so that suction pressure acts on a portion of the spool valve 986, as generally indicated at 995. When the micro spool valve 902 is in an energized state, the blocking portion 936*c* tends to maintain the micro port 1920 (connected to discharge pressure) in an open position and the micro port 1921 (connected to suction pressure) in a closed position, thus discharge pressure will be directed by the blocking portion 936*c*, via the micro port 1922 and the ports 994 to act on a portion of the spool valve 986, as generally indicated at 996. Thus, when the micro spool valve 902 is in an energized state, the spool valve 986 traverses along the beam 987, such that micro port 988*b* is closed and micro port 988*c* is open. In such a case, in an alternative embodiment, the micro port 988*c* is then in fluid communication with the suction pressure path 112 via the optional third micro port (not shown).

Optionally, the actuator 967 may be partially energized, causing the micro ports 920, 1920, 921, and 1921 all to be at least partially open. A cross over will occur between the fluid acting on the spool valve 986 at 995 and at 996. As pressure increases at 995, the spool valve 986 will traverse the beam 987 such that micro port 988*b* will start to open. Discharge from micro port 988*b* will bleed into micro port 988*c*. If the pressure applied to the portion of the spool valve 986 at 995 becomes less than the pressure at 996 then the spool valve 986 will begin to traverse the beam 987 in the opposite direction and begin to close the micro port 988*b*. In such a case, the feedback port 992 will close allowing the pressure to increase on the portion of the spool valve 986 at 995.

In the partially energized state, the spool valve 986 can be said to oscillate, preferably with relatively small oscillations, at a point determined relative to the energizing. The dashpot 991 is intended to dampen the oscillation of the spool valve 986 and generally slow the movement of the spool valve 986.

Figure 19:
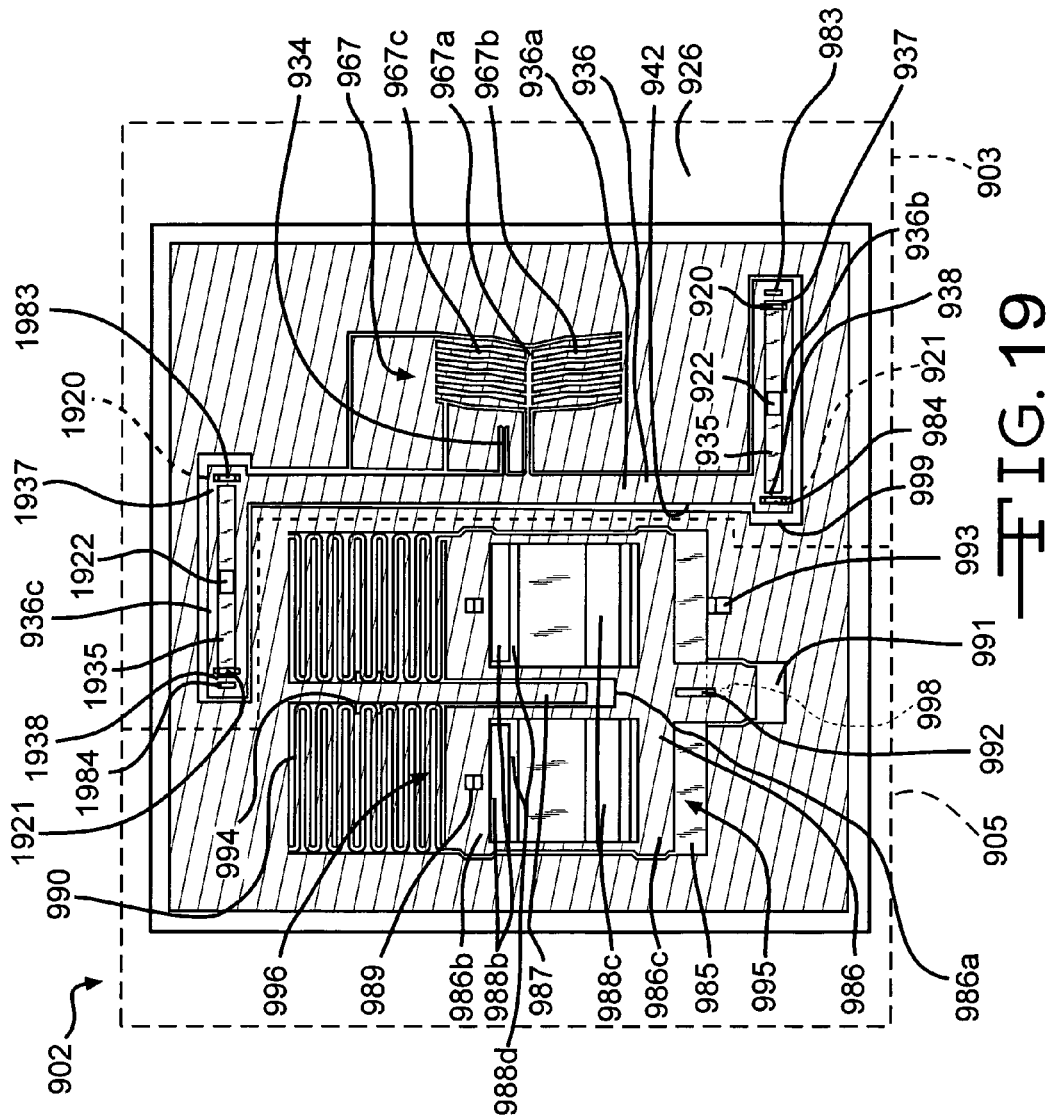
FIG. 19 is a view similar to FIG. 18, except showing a micro spool valve according to an alternative embodiment.

FIG. 19 is a view similar to FIG. 18, except showing a micro spool valve according to an alternative embodiment, and similar components are labeled with similar numbers. The pilot valve 903 is in a "z" configuration. The springs 990 are uninterrupted by any portion of the intermediate plate layer 926.

Figure 20:
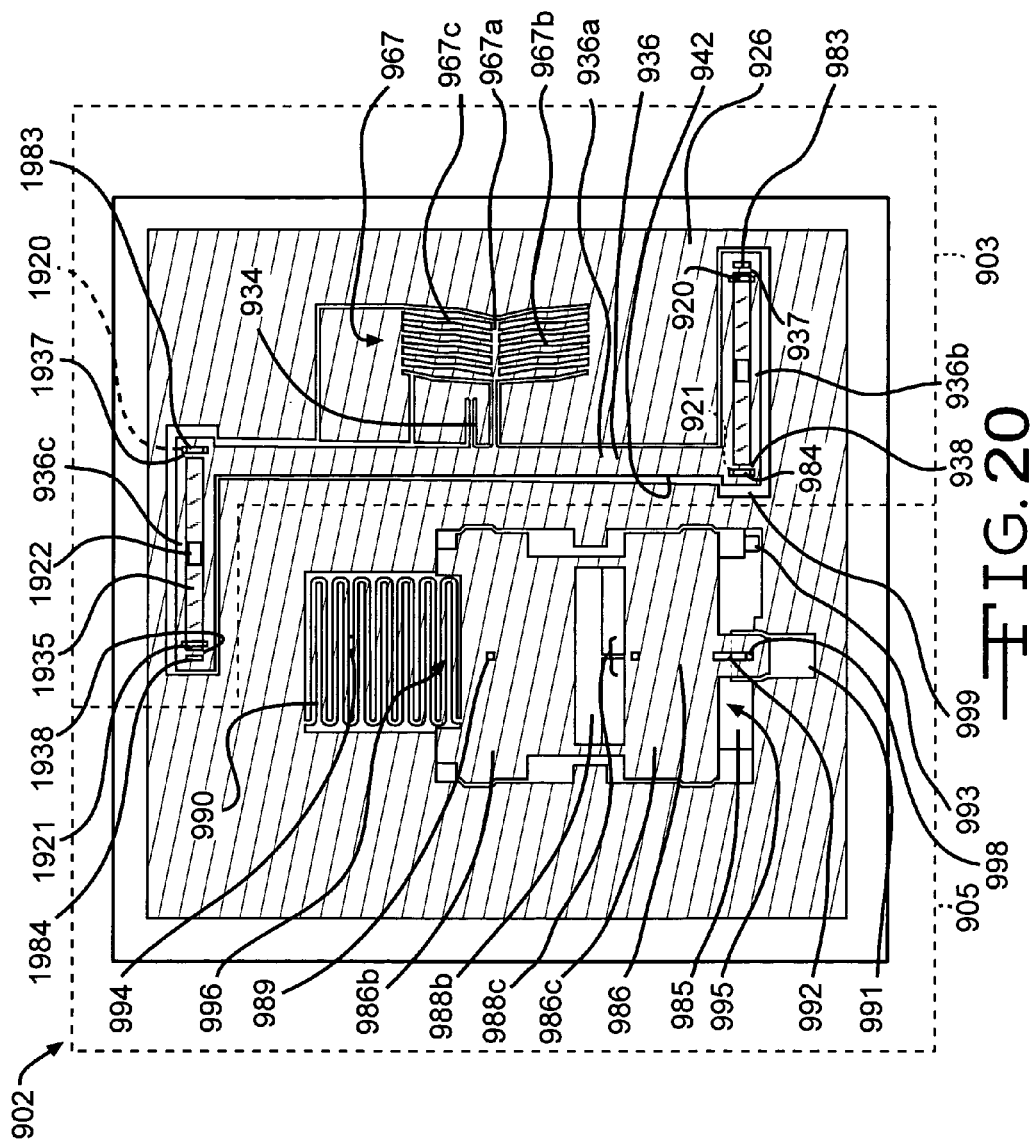
FIG. 20 is a view similar to FIG. 18, except showing a micro spool valve according to another alternative embodiment.

FIG. 20 is a view similar to FIG. 19, except showing a micro spool valve according to another alternative embodiment, and similar components are labeled with similar numbers. The spool valve 905 includes a single spring 990 and does not include a beam 987.

Although the micro spool valve 902 has been shown, in FIGS. 18, 19, and 20, as the pilot portion 903 and the spool portion 905 having been formed integrally, the pilot portion 903 and the spool portion 905 may be formed separately. For example, FIGS. 21–23 show pilot portions and spool portion as being formed separately.

Figure 21:
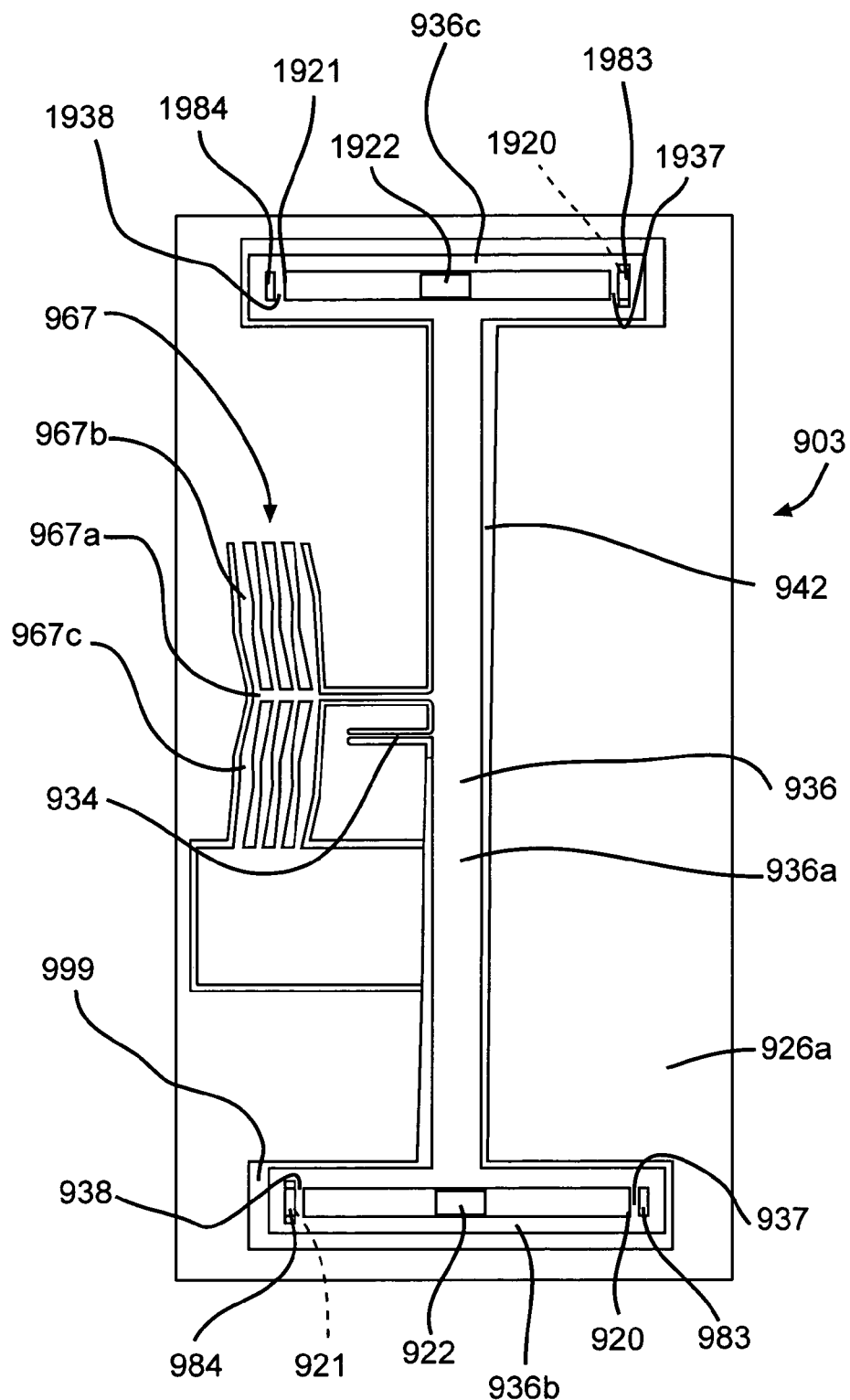
FIG. 21 is a sectional view of a layer of a pilot portion of a micro spool valve that is suitable for use as a microvalve in a microvalve operated control valve for a variable displacement compressor.

FIG. 21 is a sectional view of a layer of a pilot portion of a micro spool valve (not shown) that is suitable for use as a microvalve in a microvalve operated control valve for a variable displacement compressor. FIG. 21 is a view similar to FIG. 18, and similar components are labeled with similar numbers.

Figure 22:
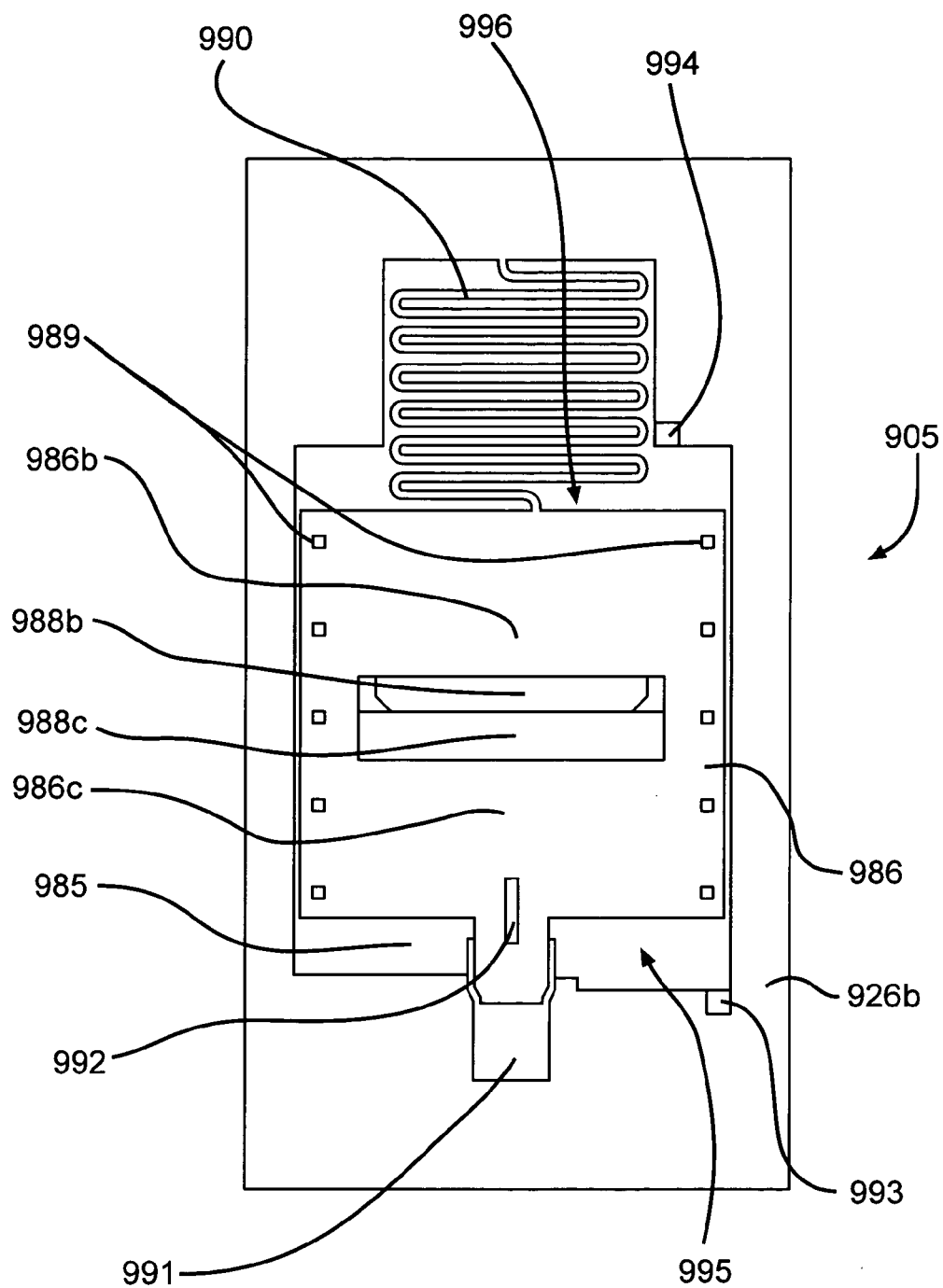
FIG. 22 is a sectional view of a layer of a spool portion of a micro spool valve that is suitable for use as a microvalve in a microvalve operated control valve for a variable displacement compressor.

FIG. 22 is a sectional view of a layer of a spool portion of a micro spool valve that is suitable for use as a microvalve in a microvalve operated control valve for a variable displacement compressor. FIG. 22 is a view similar to FIG. 20, and similar components are labeled with similar numbers. The spool valve 905 includes a plurality of micro vents 989 for pressure balancing.

Figure 23:
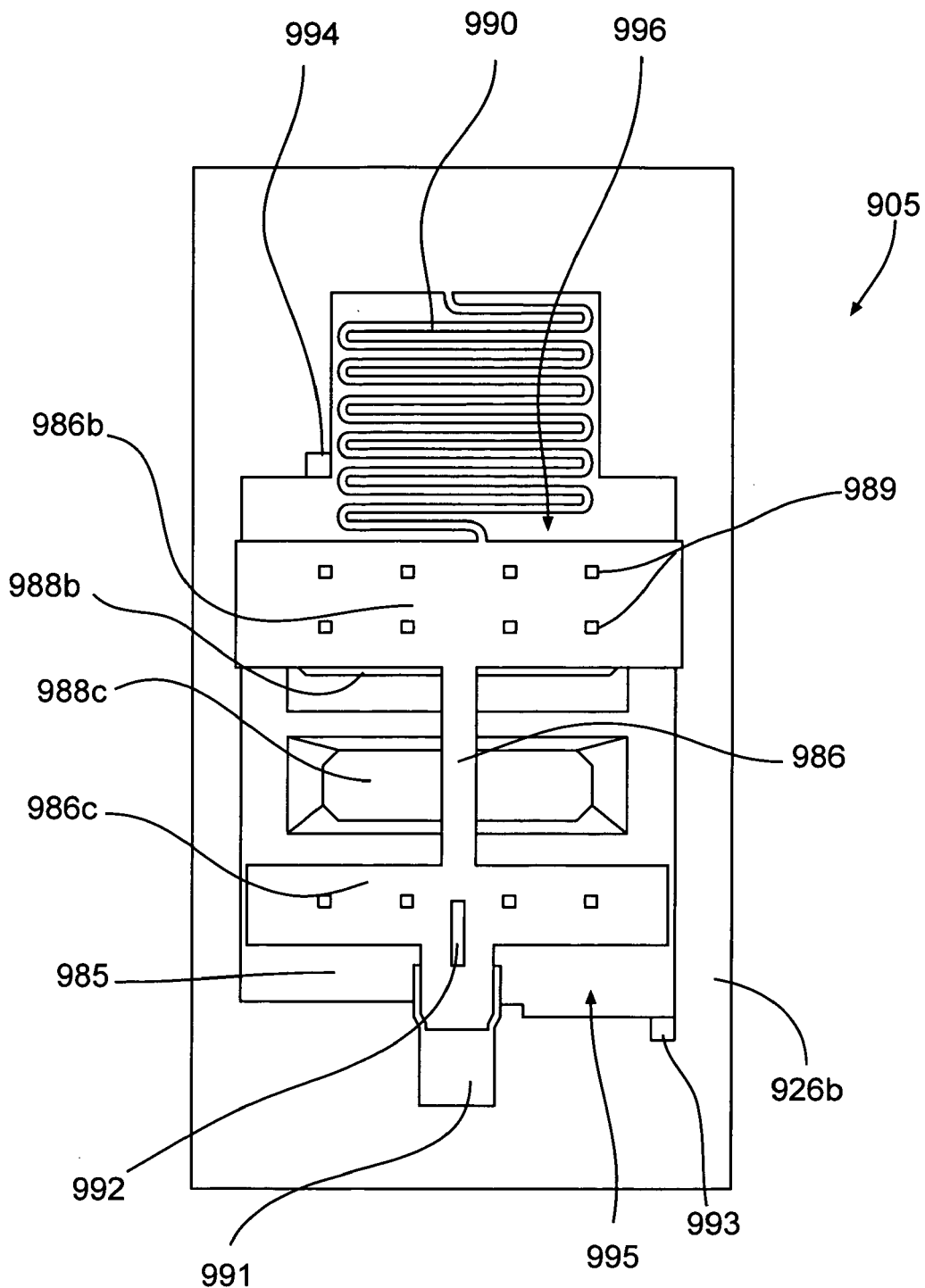
FIG. 23 is a view similar to FIG. 22, except showing a spool portion according to an alternative embodiment.

FIG. 23 is a view similar to FIG. 22, except showing a spool portion according to an alternative embodiment, and similar components are labeled with similar numbers. The spool valve 986 is in an "I" configuration.

In summary, the invention includes a microvalve device for controlling fluid flow which includes a 2-way pilot operated microvalve and a 4-way pilot microvalve for controlling the 2-way pilot operated microvalve.

The invention also includes a microvalve for controlling fluid flow which includes:

a pilot portion including:
   a pilot intermediate plate layer including a fixed portion defining a pilot cavity;
   an elongated beam disposed in the pilot cavity attached to the fixed portion of the pilot intermediate plate layer by a flexible hinge;
   an actuator attached to the fixed portion and attached to the elongated beam for moving the elongated beam relative to the fixed portion;
   a pair of pilot microvalves, each pilot valve including:
      a first micro port in fluid communication with the pilot cavity;
      a second micro port in fluid communication with the pilot cavity;
      a third micro port in fluid communication with the pilot cavity; and
      a blocking portion extending from opposite ends of the elongated beam for selectively allowing fluid communication between the first micro port and the third micro port and between the second micro port and the third micro port; and a spool portion including:
   a spool portion plate defining a spool cavity;

a spool spring disposed in the spool cavity and attached to a fixed portion of the spool portion plate;

a spool valve disposed in the spool cavity comprising:
 a first pair of spool ports in fluid communication with the spool cavity and in fluid communication with the third pilot ports;
 a second pair of spool ports in fluid communication with the spool cavity; and
 at least one blocking portion disposed in the spool cavity, attached to the spool spring, and suitable for varying the fluid communication between the second pair of spool ports in relation to the fluid communication between the first spool ports and the third pilot ports.

The invention also includes a microvalve device for controlling fluid flow including:
 a pilot body having a pilot chamber, a pair of first pilot ports, a pair of second pilot ports, and a pair of primary ports formed therein, each of the ports being in fluid communication with the chamber and being adapted for connection with one of a plurality of fluid sources, a pair of pilot microvalves being movably disposed in the pilot chamber and supported by the body for allowing selective fluid communication between the first pilot ports and the primary ports and between the second pilot ports and the primary ports;
 an actuator coupling the pilot microvalves for simultaneously moving the pilot microvalves in tandem;
 a spool body having a spool chamber having first and second ends, the first end in fluid communication with one of the primary ports, the second end in fluid communication with the other of the primary ports, and having a pair of secondary ports in fluid communication with the spool chamber;
 a spool spring attached to a fixed portion of the spool body; and
 a spool blocking portion attached to the spool spring, the spool blocking portion being movably disposed in a spool chamber for movement between a first position and a second position whereby positioning of the spool blocking section is controlled by fluid pressure varied by positioning the pilot microvalves, the spool blocking portion being operable to vary the fluid communication between the secondary ports.

The invention is also directed to a control valve in a variable displacement compressor having a piston having a displacement within a compression chamber, the compression chamber admitting a gas thereto from a suction area at a suction pressure and discharging the gas to a discharge area at a discharge pressure, a gas-filled crankcase chamber having a crankcase pressure, the displacement of the piston varying according to the crankcase pressure, the control valve controlling the crankcase pressure, the control valve including:
 a discharge pressure valve portion for opening or closing a gas communication path between the discharge area and the crankcase chamber;
 a reference chamber isolated from the crankcase chamber having a reference pressure, the reference pressure established to a predetermined reference pressure by a flow of discharge and suction pressure gas to the reference chamber;
 a pressure sensitive member having a suction pressure receiving area in gas communication with the suction pressure area and a reference pressure receiving area in gas communication with the reference chamber, the pressure sensitive member moving in response to the predetermined reference pressure and suction pressure changes;
 means for operably coupling a movement of the pressure sensitive member to open the discharge valve portion; and
 a microvalve for controlling the flow of at least one of discharge and suction pressure gas to the reference chamber in response to electrical signals, thereby establishing the predetermined reference pressure.

The invention is also directed to a 4-way microvalve for controlling fluid flow including:
 a body having an intermediate plate layer with a cavity formed therein, the body defining an inlet connection, an outlet connection, and first and second load connections in fluid communication with the cavity;
 a moveable microvalve element disposed in the cavity moveable between a first position and a second position, the moveable element being operable to allow fluid communication between the inlet connection and the first load connection and between the outlet connection and the second load connection when the moveable element is in the first position and being operable to allow fluid communication between the inlet connection and the second load connection and between the outlet connection and the first load connection when the moveable element is in the second position; and
 a microvalve actuator operable to move the moveable element between the first position and the second position.

Additionally, the invention is directed to a 2-way microvalve for controlling fluid flow including:
 a multilayer plate valve body having an intermediate plate layer with a cavity formed therein, the body defining an inlet connection and an outlet connection in fluid communication with the cavity;
 a moveable microvalve element disposed in the cavity moveable between a first position and a second position, the moveable element being operable to allow fluid communication between the inlet connection and the outlet connection when the moveable element is in the first position and being operable to block fluid communication between the inlet connection and the outlet connection when the moveable element is in the second position; and
 a feedback port formed in the moveable element operable to regulate the pressure on an end of the moveable element relative to the movement of the moveable element between the first position and the second position.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A microvalve device for controlling fluid flow comprising: a 2-way pilot operated microvalve; and
 a 4-way pilot microvalve for controlling the 2-way pilot operated microvalve;
 wherein the 4-way pilot microvalve comprises:
 a pilot body having an intermediate pilot plate layer with a pilot cavity formed therein;
 an elongated beam being movably disposed in said pilot cavity and attached to a fixed portion of said intermediate pilot plate layer by a flexible hinge so as to be moveable between a first and second position;

first and second pilot valves each including a first pilot port, a second pilot port, and a third pilot port formed in said pilot body, each of said pilot ports being in fluid communication with said pilot cavity, each of said pilot valves including a pilot blocking portion extending from opposite ends of said elongated beam and moveable with said beam in said pilot cavity; and an actuator operably coupled to said elongated beam for moving said beam between said first and second positions such that when said actuator is in an unactuated position said beam is in said first position and said third pilot ports are in fluid communication with said first pilot ports and isolated from said second pilot ports and such that when said actuator is in a fully actuated position said beam is in said second position and said second pilot ports are in fluid communication with said third pilot ports and isolated from said first pilot ports.

2. The microvalve device of claim 1 wherein when said actuator is in an intermediate position between said unactuated position and said fully actuated position said first pilot ports and said second pilot ports are both in fluid commination with said third pilot ports.

3. The microvalve device of claim 1 wherein said blocking portions extend from said elongated beam at an angle of approximately 90°.

4. The microvalve device of claim 1 wherein said blocking portions each include a slot defined therein through which fluid communication is provided between said third port and said first port when said actuator in said unactuated position and through which fluid communication is provided between said third port and said second port when said actuator in said fully actuated position.

5. A microvalve device for controlling fluid flow comprising: a 2-way pilot operated microvalve; and a 4-way pilot microvalve for controlling the 2-way pilot operated microvalve;

wherein the 2-way pilot operated microvalve comprises:

a spool microvalve body having an intermediate spool plate layer having a fixed portion a spool cavity formed therein, said spool microvalve body having a first spool port, and a second spool port, each of said spool ports formed in said spool microvalve body, each of said spool ports being in fluid communication with said spool cavity;

at least one spool spring attached to said fixed portion of said intermediate spool plate layer;

a spool valve including at least one spool blocking portion attached to said spool spring and moveably disposed in said spool cavity such that said spool blocking portion is operable to vary the fluid communication between said first spool port and said second spool port.

6. The microvalve device of claim 5 wherein the 2-way pilot operated microvalve further comprises:

a third spool port in fluid communication with the 4-way pilot microvalve; and a fourth spool port in fluid communication with the 4-way pilot microvalve, wherein said third spool port and said fourth spool port are in fluid communication with said spool cavity and are each formed in said spool microvalve body so as to provide fluid communication at either end of said spool blocking portion to move said spool blocking portion in response to changes in fluid pressure from said pilot microvalve.

7. The microvalve device of claim 5 wherein the 2-way pilot operated microvalve further comprises a dashpot defined by a longitudinal protrusion of one end of said blocking portion cooperating with a corresponding recess formed in said fixed portion, said dashpot being operable to dampen oscillations of said spool valve.

8. The microvalve device of claim 5 wherein the 2-way pilot operated microvalve further comprises a spool beam extending longitudinally from said fixed portion and said spool blocking portion defines a recessed portion, said recessed portion slidably engaging said spool beam.

9. A microvalve for controlling fluid flow comprising:

a pilot portion comprising:

a pilot intermediate plate layer including a fixed portion defining a pilot cavity;

an elongated beam disposed in the pilot cavity attached to said fixed portion of the pilot intermediate plate layer by a flexible hinge;

an actuator attached to the fixed portion and attached to the elongated beam for moving the elongated beam relative to the fixed portion;

a pair of pilot microvalves, each pilot valve comprising:

a first micro port in fluid communication with said pilot cavity;

a second micro port in fluid communication with said pilot cavity;

a third micro port in fluid communication with said pilot cavity; and a blocking portion extending from opposite ends of said elongated beam for selectively allowing fluid communication between said first micro port and said third micro port and between said second micro port and said third micro port; and a spool portion comprising:

a spool portion plate defining a spool cavity;

a spool spring disposed in said spool cavity and attached to a fixed portion of said spool portion plate;

a spool valve disposed in the spool cavity comprising:

a first pair of spool ports in fluid communication with said spool cavity and in fluid communication with said third pilot ports;

a second pair of spool ports in fluid communication with said spool cavity; and at least one blocking portion disposed in said spool cavity, attached to said spool spring, and suitable for varying the fluid communication between said second pair of spool ports in relation to the fluid communication between the first spool ports and the third pilot ports.

10. The microvalve of claim 9 wherein an intermediate layer plate of a multi-layer valve body comprises the pilot portion plate and the spool portion plate.

11. A microvalve device for controlling fluid flow comprising:

a pilot body having a pilot chamber, a pair of first pilot ports, and a pair of second pilot ports, and a pair of primary ports formed therein, each of said ports being in fluid communication with said chamber and being adapted for connection with one of a plurality of fluid sources, a pair of pilot microvalves being movably disposed in said pilot chamber and supported by said body for allowing selective fluid communication between said first pilot ports and said primary ports and between said second pilot ports and said primary ports;

an actuator coupling said pilot microvalves for simultaneously moving said pilot microvalves in tandem;

a spool body having a spool chamber having first and second ends, said first end in fluid communication with one of said primary ports, said second end in fluid communication with the other of said primary ports, and having a pair of secondary ports in fluid communication with said spool chamber;
a spool spring attached to a fixed portion of said spool body; and
a spool blocking portion attached to said spool spring, said spool blocking portion being movably disposed in a spool chamber for movement between a first position and a second position whereby positioning of said spool blocking section is controlled by fluid pressure varied by positioning said pilot microvalves, said spool blocking portion being operable to vary the fluid communication between said secondary ports.

* * * * *